US00RE48904E

(19) United States
(12) Reissued Patent
Briggs et al.

(10) Patent Number: US RE48,904 E
(45) **Date of Reissued Patent: *Jan. 25, 2022**

(54) METHOD AND APPARATUS FOR SELECTIVELY SHARING AND PASSIVELY TRACKING COMMUNICATION DEVICE EXPERIENCES

(71) Applicant: Ikorongo Technology, LLC, Chapel Hill, NC (US)

(72) Inventors: Darren P. Briggs, Nashville, TN (US); Brady O. Bruce, San Francisco, CA (US); Michael W. Mitchell, Santa Cruz, CA (US); Emile L. Reed, IV, Denver, CO (US)

(73) Assignees: Ikorongo Technology, LLC, Chapel Hill, NC (US); Ikorongo Texas, LLC

( * ) Notice: This patent is subject to a terminal disclaimer.

(21) Appl. No.: 14/550,100

(22) Filed: Nov. 21, 2014

Related U.S. Patent Documents

Reissue of:
(64) Patent No.: 7,080,139
Issued: Jul. 18, 2006
Appl. No.: 09/841,475
Filed: Apr. 24, 2001

U.S. Applications:
(63) Continuation of application No. 13/893,992, filed on May 14, 2013, now Pat. No. Re. 45,351, which is an application for the reissue of Pat. No. 7,080,139, and a continuation of application No. 12/820,579, filed on Jun. 22, 2010, now Pat. No. Re. 44,324, and a continuation of application No. 12/172,518, filed on Jul. 14, 2008, now Pat. No. Re. 41,450.

(51) Int. Cl.
*G06F 15/173* (2006.01)
*G06Q 30/02* (2012.01)

(52) U.S. Cl.
CPC ..... *G06Q 30/0256* (2013.01); *G06Q 30/02* (2013.01); *Y10S 707/99933* (2013.01)

(58) Field of Classification Search
CPC ..... G06Q 30/02; G06Q 30/0256; Y10S 707/99933
USPC ..... 709/203–207, 224; 705/319; 706/26, 27
See application file for complete search history.

(56) References Cited

U.S. PATENT DOCUMENTS 5,349,678 A 9/1994 Morris et al.
5,493,692 A 2/1996 Theimer et al.
(Continued)

FOREIGN PATENT DOCUMENTS

CA 2420684 A1 3/2002
EP 0874248 A2 10/1998
(Continued)

OTHER PUBLICATIONS

"Google Acquires Usenet Discussion Service And Significant Assets From Deja.com," Google News, Feb. 12, 2001, 2 pages.
(Continued)

*Primary Examiner* — Adam L Basehoar

(57) ABSTRACT

The present invention includes methods and devices for passively tracking and selectively sharing user experiences with communication devices, including computers, web-enabled telephones, and PDAs. User rating or comments on their experiences can be captured. Particular aspects of the present invention are described in the claims, specification and drawings.

54 Claims, 26 Drawing Sheets

AMENDED

(56) References Cited

U.S. PATENT DOCUMENTS 5,568,645 A 10/1996 Morris et al.
5,659,596 A * 8/1997 Dunn ..... H04W 4/12 455/456.1
5,760,917 A * 6/1998 Sheridan ..... 358/442
5,761,669 A * 6/1998 Montague ..... G06F 21/604 707/758
5,790,426 A * 8/1998 Robinson ..... G06F 17/30699 702/179
5,796,952 A * 8/1998 Davis ..... G06F 11/3419 707/E17.12
5,796,967 A 8/1998 Filepp et al.
5,808,612 A 9/1998 Merrick et al.
5,808,613 A 9/1998 Marrin et al.
5,938,271 A 8/1999 Schuler
5,948,083 A 9/1999 Gervasi
5,956,715 A * 9/1999 Glasser ..... G06F 17/30221
5,982,289 A 11/1999 Kingsley
6,016,475 A * 1/2000 Miller ..... G06F 17/30867 705/26.7
6,018,619 A 1/2000 Allard et al.
6,041,311 A * 3/2000 Chislenko ..... G06F 17/30699 705/26.7
6,052,122 A 4/2000 Sutcliffe et al.
6,064,980 A * 5/2000 Jacobi ..... G06Q 30/06 705/1.1
6,094,681 A * 7/2000 Shaffer ..... G06Q 10/10 709/206
6,115,611 A 9/2000 Kimoto et al.
6,151,585 A 11/2000 Altschuler et al.
6,195,654 B1 * 2/2001 Wachtel ..... 707/3
6,208,866 B1 3/2001 Rouhollahzadeh et al.
6,236,978 B1 * 5/2001 Tuzhilin ..... G06Q 30/018 705/14.25
6,240,069 B1 5/2001 Alperovich et al.
6,249,773 B1 * 6/2001 Allard ..... G06Q 30/06 705/26.8
6,250,930 B1 6/2001 Mintz
6,269,369 B1 * 7/2001 Robertson ..... G06Q 10/02
6,301,609 B1 * 10/2001 Aravamudan ..... H04L 51/26 707/999.001
6,317,718 B1 11/2001 Fano
6,332,127 B1 12/2001 Bandera
6,356,838 B1 3/2002 Paul
6,414,635 B1 * 7/2002 Stewart ..... G01S 5/12 342/457
6,438,579 B1 8/2002 Hosken
6,456,854 B1 9/2002 Chern
6,466,788 B1 10/2002 Carlsson
6,480,885 B1 * 11/2002 Olivier ..... 709/207
6,493,702 B1 12/2002 Adar et al.
6,506,657 B1 1/2003 Essaian
6,519,648 B1 2/2003 Eyal
6,549,768 B1 4/2003 Fraccaroli
6,549,937 B1 4/2003 Auerbach et al.
6,553,236 B1 4/2003 Dunko
6,567,661 B2 5/2003 McDonnell
6,578,072 B2 * 6/2003 Watanabe et al. ..... 709/217
6,606,657 B1 8/2003 Zilberstein et al.
6,618,593 B1 9/2003 Drutman et al.
6,631,496 B1 * 10/2003 Li ..... G06F 17/30884 707/999.01
6,636,836 B1 10/2003 Pyo
6,654,786 B1 11/2003 Fox et al.
6,654,789 B1 11/2003 Bliss et al.
6,662,231 B1 12/2003 Drosset et al.
6,668,173 B2 * 12/2003 Greene ..... H04W 8/14 455/445
6,714,791 B2 * 3/2004 Friedman ..... H04L 29/06 455/456.1
6,714,931 B1 * 3/2004 Papierniak ..... G06F 11/3409
6,757,740 B1 6/2004 Parekh et al.
6,792,086 B1 9/2004 Saylor et al.
6,795,856 B1 9/2004 Bunch
6,799,277 B2 9/2004 Colvin
6,813,775 B1 11/2004 Finseth et al.
6,832,230 B1 12/2004 Zilliacus et al.
6,895,084 B1 5/2005 Saylor et al.
6,895,437 B1 * 5/2005 Cowdrey ..... G06F 11/3495 709/202
6,924,002 B2 8/2005 Lee et al.
6,931,419 B1 * 8/2005 Lindquist ..... G06Q 10/109 705/26.1
6,944,447 B2 9/2005 Portman
6,947,922 B1 * 9/2005 Glance ..... G06F 17/30017 705/26.1
6,957,199 B1 10/2005 Fisher
6,968,179 B1 * 11/2005 De Vries ..... H04L 12/5895 455/414.1
6,993,564 B2 * 1/2006 Whitten, II ..... H04L 29/06 709/205
6,993,590 B1 * 1/2006 Gauthier ..... G06F 11/3476 705/1.1
7,031,961 B2 * 4/2006 Pitkow ..... G06F 17/30884
7,032,023 B1 4/2006 Barrett
7,039,699 B1 * 5/2006 Narin ..... G06Q 30/02 709/207
7,047,030 B2 5/2006 Forsyth
7,047,209 B2 5/2006 Filepp et al.
7,072,665 B1 7/2006 Blumberg et al.
7,080,139 B1 7/2006 Briggs et al.
7,107,317 B2 * 9/2006 Demsky ..... G06Q 30/02 709/202
7,130,630 B1 10/2006 Enzmann
7,133,685 B2 11/2006 Hose
7,133,909 B2 11/2006 Bahl
7,143,130 B2 11/2006 Lin
7,162,460 B2 1/2007 Cleckler et al.
7,185,192 B1 * 2/2007 Kahn ..... G06F 21/6218 707/999.003
7,302,634 B2 11/2007 Lucovsky et al.
7,343,317 B2 3/2008 Jokinen et al.
7,343,564 B2 * 3/2008 Othmer ..... H04W 4/20 715/774
7,366,522 B2 4/2008 Thomas
7,412,202 B2 * 8/2008 Gutta ..... H04H 60/65 348/E7.061
7,433,832 B1 * 10/2008 Bezos ..... G06Q 10/10 705/26.8
7,467,212 B2 12/2008 Adams et al.
7,478,054 B1 * 1/2009 Adams ..... G06Q 10/10 705/26.43
7,523,191 B1 4/2009 Thomas et al.
7,627,652 B1 * 12/2009 Commons ..... H04L 67/1097 709/213
7,664,669 B1 2/2010 Adams et al.
7,669,212 B2 2/2010 Alao et al.
7,725,523 B2 5/2010 Bolnick et al.
7,739,139 B2 6/2010 Robertson
RE41,450 E 7/2010 Briggs
7,769,620 B1 8/2010 Fernandez
7,801,542 B1 * 9/2010 Stewart ..... G06Q 50/01 455/414.1
7,953,815 B2 5/2011 Kaufman
7,970,390 B2 6/2011 Fraccaroli
8,027,691 B2 9/2011 Bernas et al.
8,090,776 B2 * 1/2012 Torres ..... G06F 17/3089 709/204
8,099,667 B1 1/2012 Appelman
8,103,729 B2 1/2012 Tornabene et al.
8,271,487 B1 * 9/2012 Hermush ..... H04N 5/4401 707/734
8,295,835 B2 10/2012 Coppinger et al.
8,423,622 B2 4/2013 Jhanji
RE44,324 E 6/2013 Briggs et al.
8,572,198 B2 10/2013 Jhanji
8,589,247 B2 11/2013 Mesaros
8,701,022 B2 4/2014 Sharpe et al.
8,762,471 B2 6/2014 Robertson et al.
8,892,117 B2 11/2014 Obradovich et al.
RE45,351 E 1/2015 Briggs et al.
RE45,543 E 6/2015 Briggs et al.
9,129,329 B2 9/2015 Robertson

(56) References Cited

U.S. PATENT DOCUMENTS

| | | | | |
|---|---|---|---|---|
| 9,940,401 | B2 * | 4/2018 | Gang | G06F 17/30873 |
| 2001/0001711 | A1 | 5/2001 | Olshenitsky et al. | |
| 2001/0016839 | A1 | 8/2001 | Nichols | |
| 2001/0027472 | A1 * | 10/2001 | Guan | H04W 4/00 709/203 |
| 2001/0034638 | A1 * | 10/2001 | Kelley | G06Q 30/02 705/7.29 |
| 2001/0036224 | A1 * | 11/2001 | Demello et al. | 375/220 |
| 2001/0048449 | A1 | 12/2001 | Baker | |
| 2002/0004402 | A1 * | 1/2002 | Suzuki | G06F 17/30902 455/456.6 |
| 2002/0023230 | A1 * | 2/2002 | Bolnick | G06Q 30/02 726/28 |
| 2002/0035609 | A1 | 3/2002 | Lesard et al. | |
| 2002/0049686 | A1 * | 4/2002 | Chuang et al. | 706/45 |
| 2002/0052925 | A1 * | 5/2002 | Kim et al. | 709/217 |
| 2002/0062368 | A1 | 5/2002 | Holtzman | |
| 2002/0065802 | A1 | 5/2002 | Uchiyama | |
| 2002/0069312 | A1 | 6/2002 | Jones | |
| 2002/0072955 | A1 | 6/2002 | Brock | |
| 2002/0087382 | A1 | 7/2002 | Tiburcio | |
| 2002/0087496 | A1 * | 7/2002 | Stirpe et al. | 706/45 |
| 2002/0087686 | A1 * | 7/2002 | Cronk | G06F 17/30899 709/225 |
| 2002/0095333 | A1 * | 7/2002 | Jokinen | G06Q 30/02 705/14.26 |
| 2002/0095486 | A1 * | 7/2002 | Bahl | H04L 29/06 709/223 |
| 2002/0103734 | A1 * | 8/2002 | Glassco | G06F 8/71 705/35 |
| 2002/0107027 | A1 | 8/2002 | ONeil | |
| 2002/0115453 | A1 | 8/2002 | Poulin et al. | |
| 2002/0124053 | A1 * | 9/2002 | Adams | G06F 9/468 709/216 |
| 2002/0143933 | A1 * | 10/2002 | Hind | G06Q 30/02 709/224 |
| 2002/0144259 | A1 | 10/2002 | Gutta et al. | |
| 2002/0145984 | A1 | 10/2002 | Babu et al. | |
| 2002/0160745 | A1 | 10/2002 | Wang | |
| 2002/0194006 | A1 | 12/2002 | Challapali | |
| 2003/0014477 | A1 * | 1/2003 | Oppenheimer | H04L 12/1813 709/203 |
| 2003/0018799 | A1 | 1/2003 | Eyal | |
| 2003/0022684 | A1 | 1/2003 | Seeger | |
| 2003/0050976 | A1 * | 3/2003 | Block | G06Q 10/10 709/203 |
| 2003/0054810 | A1 * | 3/2003 | Chen et al. | 455/422 |
| 2003/0055983 | A1 * | 3/2003 | Callegari | G06F 17/30241 709/227 |
| 2003/0131073 | A1 * | 7/2003 | Lucovsky | G06F 21/335 709/219 |
| 2003/0225836 | A1 * | 12/2003 | Lee et al. | 709/205 |
| 2004/0088271 | A1 | 5/2004 | Cleckler et al. | |
| 2004/0088355 | A1 * | 5/2004 | Hagan et al. | 709/203 |
| 2004/0249938 | A1 * | 12/2004 | Bunch | H04L 43/00 709/224 |
| 2005/0028207 | A1 * | 2/2005 | Finseth | H04N 7/17318 725/46 |
| 2005/0165920 | A1 * | 7/2005 | Kerr | G06F 3/0481 709/223 |
| 2005/0234922 | A1 * | 10/2005 | Parekh | G06F 17/30241 |
| 2005/0271514 | A1 | 12/2005 | Lee et al. | |
| 2007/0282621 | A1 * | 12/2007 | Altman | G06Q 50/10 705/319 |
| 2009/0183091 | A1 | 7/2009 | Sharpe et al. | |
| 2009/0271514 | A1 | 10/2009 | Thomas et al. | |
| 2014/0081753 | A1 | 3/2014 | Mesaros | |

FOREIGN PATENT DOCUMENTS

| | | | |
|---|---|---|---|
| EP | 1323318 | A1 | 7/2003 |
| EP | 2312871 | A1 | 4/2011 |
| GB | 2309105 | A | 7/1997 |
| JP | H11272698 | A | 10/1999 |
| JP | 2002196778 | | 7/2002 |
| KR | 20020007934 | A | 1/2002 |
| WO | 2001006497 | A2 | 1/2001 |
| WO | 200142942 | A1 | 6/2001 |
| WO | 200193096 | A2 | 12/2001 |
| WO | 200209456 | A2 | 1/2002 |
| WO | 2002021864 | A1 | 3/2002 |

OTHER PUBLICATIONS

Abstract, Korean Patent Publication No. 20020007934, published Jan. 29, 2002, "Electronic Album System for Wire/Wireless Internet Diary," Korean Patent Application No. 20000042073, filed Jul. 19, 2000, Applicant/Inventor: Park Jong Deuk, obtained from www.espacenet.com, printed Nov. 29, 2011, 1 page.

Abstract, Japanese Patent Publication No. 2002-196778, published Jul. 12, 2002, "Information Reproducing Apparatus with Reproduction Function Giving Priority to History," Japanese Patent Application No. 2000-392591, filed Dec. 25, 2000, Applicant: Kenwood Corp, Inventor: Negi Takeshi, obtained from Patent Abstracts of Japan, printed Nov. 29, 2011, 1 page.

"Rhapsody Unlimited," at <http://learn.rhapsody.com/plans/unlimited?src=rcom_acctcrt_uld&pcode=rn>, copyright 2001-2008, Listen.com, subsidiary of RealNetworks, printed Aug. 13, 2009, 1 page.

Non-Final Office Action for U.S. Appl. No. 09/841,475, dated Aug. 12, 2004, 12 pages.

Final Office Action for U.S. Appl. No. 09/841,475, dated Jun. 8, 2005, 15 pages.

Notice of Allowance for U.S. Appl. No. 09/841,475, dated Feb. 28, 2006,7 pages.

Notice of Allowance for U.S. Appl. No. 12/172,518, dated Mar. 5, 2010, 17 pages.

Non-Final Office Action for U.S. Appl. No. 12/820,579, dated May 23, 2011, 19 pages.

Final Office Action for U.S. Appl. No. 12/820,579, dated Jun. 18, 2012, 27 pages.

Advisory Action for U.S. Appl. No. 12/820,579, dated Oct. 19, 2012, 3 pages.

Notice of Allowance for U.S. Appl. No. 12/820,579, dated Feb. 14, 2013, 11 pages.

Non-Final Office Action for U.S. Appl. No. 13/893,992 dated Sep. 24, 2014,23 pages.

Notice of Allowance for U.S. Appl. No. 13/893,992 dated Nov. 13, 2014, 6 pages.

Non-Final Office Action for U.S. Appl. No. 14/550,100 dated Oct. 12, 2017, 41 pages.

Final Office Action for U.S. Appl. No. 14/550,100, dated Feb. 20, 2019, 43 pages.

Non-Final Office Action for U.S. Appl. No. 14/577,746 dated Mar. 31, 2017,45 pages.

Final Office Action for U.S. Appl. No. 14/577,746, dated Sep. 5, 2018, 38 pages.

Non-Final Office Action for U.S. Appl. No. 14/577,746 dated May 8, 2019, 35 pages.

IPR2020-01379, Petition for Inter Partes Review of Claims 45, 47-57, 60-62, 64-68, 71-72, and 76 Of U.S. Pat. No. Re. 45,543, Filed on Aug. 6, 2020, United Patents.

Frank Hargrave, Hargrave's Communications Dictionary, pp. 435-436 (IEEE Press 2001).

Zygmunt J. Haas & Sanjoy Paul, Limited-lifetime Shared-access in Mobile Systems, 3 1995 IEEE Int'l Conf. On Comm. 1404 (1995), 5 pages.

Mahadev Satyanarayanan, Accessing Information on Demand at Any Location: Mobile Information Access, IEEE Pers Comm., Feb. 1996, 8 pages.

Mitsuoka et al., Instant messaging with mobile phones to support awareness, in Proceedings 2001 Symposium On Applications and the Internet (2001), 8 pages.

3GPP, Technical Specification Group Services and System Aspects, 3G TS 23.271 v.2.0.0 (2000), 57 pages.

(56) References Cited

OTHER PUBLICATIONS

H. Krasner et al., Groupware Research and Technology Issues with Application to Software Process Management, in IEEE Transactions on Systems, Man, and Cybernetics 704 (1991), 9 pages.
Vora et al., Privacy and Digital Rights Management (2001), available at https://www.w3.org/2000/12/drm-ws/pp/hp-poorvi2.html, 7 pages.
Enterprise Application Server, SYBASE (2000), available at http://www.upi.pr.it/docs/easfg/easvrfgp1.htm, 4 pages.
A. Harmon, Software That Tracks E-Mail Is Raising Privacy Concerns, The New York Times, available at https://www.nytimes.com/2000/11/22/business/software-that-tracks-e-mail-is-raising-privacy-concerns.html, 5 pages.
3GPP Location Standards Release 4.1 (Mar. 2001), 57 pages.
Abowd, Gregory, Cyberguide: A mobile context-aware tour guide, in Science Publishers, 13 pages.
Benefon: Personal Navigation Phone, available at www.benefon.com, 4 pages.
Benefon ESC! Owners Manual available at www.benefon.com, 2002, 169 pages.
Cockburn, Andrew, Making Contact: Getting the Group Communication with Groupware, in Association for Computing Machinery, 1993, 11 pages.
Burak, Assaf, Analyzing Usage of Location Based Services, in Association for Computing Machinery, Apr. 5, 2003, 2 pages.
Godefroid, Patrice, in Ensuring Privacy in Presense Awareness Systems: An Automated Verification Approach, 10 pages.
Godefroid, Patrice, in Ensuring Privacy in Presense Awareness Systems: An Automated Verification Approach, 7 pages.
Godefroid, Patrice, in Ensuring Privacy in Presense Awareness Systems: An Automated Verification Approach, 2 pages.
Geoworks Professional Services Group Selected By Seiko Epson For Next Generation Products, available at http://www.mobic.com/oldnews/9911/geoworks_professional_services_g.htm, 1 page.
Lead Kindly Satellite, in The Economic Times, 2 pages.
A High-Tech Wonder That Helps You Wander, in The Economic Times, Jul. 26, 1999, 4 pages.
Trimble GPS Technology Enables Seiko Epson Communication Device and Wireless Data Service, in Trimble News Release, available at https://www.trimble.com/news/release.aspx?id=110899a, Nov. 8, 1999, 2 pages.
Ericsson's new mobile positioning system uses standard GSM phones , available at https://news.cision.com/ericssonNericsson-s-new-mobile-positioning-system-uses-standard-gsm-phones,c4749, Nov. 5, 1998, 1 pages.
Estonian operator to launch world's first Network-based location services, Oct. 11, 1999, 2 pages.
Ericsson introduces Mobile Positioning System to operators on four continents during 2000, Jun. 5, 2000, 1 page.
Navtalk Cellular Phone/GPS Receiver Owners Manual, Jan. 2000, 128 pages.
Hughes, Phil, Linux Journal: Nokia Media Terminal, available at https://www.linuxjournal.com/article/4336, Nov. 2000, 4 pages.
Nokia Insight, Jun. 2005, 36 pages.
Rick Lehrbaum, Device Profile: Nokia Media Termnial, https://web.archive.org/web/20000709102859/http://www.ericsson.com/pressroom/Archive1199904/19991011-0002.html, Oct. 2000, 6 pages.
Nokia Oyi, Nokia brings Internet to the living room with Linux-based home products, available at https://www.globenewswire.com/news-release/2000/09/08/1845606/0/en/Nokia-brings-Internet-to-the-living-room-with-Linux-based-home-product.html, Sep. 2000, 2 pages.
Vliet, Dr Harry Van, Where Television and Internet meet . . . New experiences for rich media, Dec. 2001, 36 pages.
Want, Roy, The Active Badge Location System, Olivetti Research Ltd., 10 pages.
Schilit, Bill, The PARCTAB Mobile Computing System, Palo Alto Research Center, Palo Alto, CA, 1993, 6 pages.
Want, Roy, The PARCTAB Ubiquitous Computing Experiment, 57 pages.
BFFound.com, available at https://web.archive.org/web/20001001022459/http:/www.signalsoftcorp.com/products/tracking.html, 2 pages.
Location Sensitive Billing, available at https://web.archive.org/web/20000617024705/http:/www.signalsoftcorp.com/products/location_billing.html, 4 pages.
SignalSoftKnows Where It's At, available at https://wwwlightreading.com/ethernet-ip/signalsoft-knows-where-its-at/d/d-d/571389[9/27/20206:28:01PM, Oct. 20, 2000 6 pages.
Products local.info, available at https://web.archive.org/web/20000824145601/http://www.signalsoftcorp.comlproductsllocal_info.html, 3 pages.
Location—Manager Maps, available at https://web.archive.org/web/20000930221102/http:/www.signalsoftcorp.com:80/products/location_manager.html, 3 pages.
Product—Maps, available at https://web.archive.org/web/20001001014707/http:/www.signalsoftcorp.com:80/products/maps.html, 3 pages.
Business Wire, SignalSoft's local.info Alliance Grows to Over 150 Members, Mar. 19, 2001, 3 pages.
RCR Wireless News, Intelligence On All Things Wireless, 11 pages.
SignalSoft Wireless Location Services, Products, available at https://web.archive.org/web/20000824145440/http:/www.signalsoftcorp.com/products/, Aug. 24, 2000, 2 pages.
SignalSoft Wireless Location Services, Products Wireless 9-1-1, available at "https://web.archive.org/web/20001001045017/http://www.signalsoftcorp.comlproductslwireless_911.html", 3 pages.
Spreitzer, Mike, Architectural Considerations for Scalable,Secure, Mobile C omputing with Location Information, 1994, 10 pages.
TravTek Analysis, 126 Pages.
TravTek System Architecture Evaluation, Jul. 1995, 130 pages.
Krage, Mark, The TravTek Driver Information System, 14 pages.
TravTek Evaluation Modeling Study, Mar. 1996, 134 pages.
Rillings, James, TravTek, 10 pages.
Goran M. Djuknic & Robert E. Richton, Geolocation and Assisted GPS, Comput., Feb. 2001, 3 pages.
Jim Waldo et al., Sun Microsystems Laboratories, Inc., A Note on Distributed Computing (1994), 14 pages.
Niranjan G. Shivaratri et al., Load Distributing for Locally Distributed Systems, Comput., Dec. 1992, 12 pages.
Jim Gray, An Approach to Decentralized Computer Systems (1985), 44 pages.
Flavin Cristian, Understanding Fault-Tolerant Distributed Systems, Communications of the ACM, Feb. 1991, 23 pages.
Microsoft Campus Agreement: How to Get Started (Feb. 9, 2001), available at https://www.uprm.edu/cms/index.php?a=file&fid=126, 15 pages.
Platform Services, Openwave, https://web.archive.org/web/20020206231928/http:/www.openwave. com/products/platform_services/, 1 page.
Jay Farrell & Tony Givargis, Differential GPS Reference Station Algorithm—Design and Analysis, 8 IEEE Transactions on Control Sys. Tech. 519 (2000), 13 pages.
François J.N. Cosquer & Paulo Verissimo, The Impact of Group Communication Paradigms on Groupware Support, in Proceedings of the Fifth IEEE Computer Soc. Workshop on Future Trends of Distributed Computing Sys. 207 (1995), 8 pages.
M. Kolland et al., Information Sharing in Collaborative Environments, in Proceedings Third Workshop on Enabling Tech.: Infrastructure for Collaborative Enterprises 140 (1994), 15 pages.
Amended Complaint, Case Name *Ikorongo Texas LLC and Ikorongo Technology LLC* V. *Bumble Trading Inc.*, Case No. 6:20-CV-00256, Western District of Texas, Filed Apr. 1, 2020, 166 Pages.
Amended Complaint, Case Name *Ikorongo Texas LLC and Ikorongo Technology LLC* V. *Lg Electronics Inc.*, Case No. 6:20-Cv-00257, Western District of Texas, Filed Apr. 1, 2020, 296 Pages.
Amended Complaint, Case Name *Ikorongo Texas LLC and Ikorongo Technology LLC* V. *Lyft, Inc.*, Case No. 6:20-Cv-00258, Western District of Texas, Filed Apr. 1, 2020, 181 Pages.
Amended Complaint, Case Name *Ikorongo Texas LLC and Ikorongo Technology LLC* V. *Samsung Electronics Co., Ltd*, Case No. 6:20-Cv-00259, Western District of Texas, Filed Apr. 1, 2020, 293 Pages.

(56) References Cited

OTHER PUBLICATIONS

"Privacy Online: Fair Information Practices in the Electronic Marketplace: A Report to Congress," Federal Trade Commission (May 2000) FTC.
Blake, Edwin, et al., "A Field Computer for Animal Trackers" Blake), published in Jan. 2001.
Werbach, Kevin, "Location-Based Computing: Wherever You Go, There You Are," Esther Dyson's Monthly Report Release 1.0 (Jun. 28, 2000) ("Werbach").
Wu, Zhengwei et al., "Predict User In-World Activity via Integration of Map Query and Mobility Trace" ("Wu").
Amended Complaint, Case Name *Ikorongo Texas LLC and Ikorongo Technology LLC* V. *Uber Technologies, Inc.*, Case No. 6:20-Cv-00843, Western District of Texas, Filed Sep. 16, 2020, 175 pages.
Lohr, Steve, "Online Industry Seizes the Initiative on Privacy", N.Y. Times, Oct. 11, 1999, 6 pages.
Abstract, Australian Patent Publication No. AU2073401 published Jun. 18, 2001, "Tools for administering leagues and accessing and populating a community websitestructure" obtained from Patent Abstracts of Australia, printed Aug. 10, 2021, 2 pages.
Abstract, Australian Patent Publication No. AU7699201 published Feb. 5, 2002, "Method and system for location-aware wireless mobile devices including mobile user network message interfaces and protocol" obtained from Patent Abstracts of Australia, printed Aug. 10, 2021, 2 pages.

* cited by examiner

AMENDED

AMENDED

AMENDED

AMENDED

AMENDED

AMENDED

AMENDED

AMENDED

Edit fatbubble° Profile - friskyriggs

View | Edit

| Buddy Overview | Contact Information | Topic Sharing | File Sharing |
|---|---|---|---|

Use the checkboxes below to select which topic areas you want to share by default. You'll be able to turn these topic areas on or off for each user. More Info 891 892

Topics ☑ Select/Deselect All

☑ Arts & Entertainment
☑ Computers & Internet
☑ Food
☑ Games
☑ Health & Fitness
☑ Home
☑ Money
☑ Music
☑ News
☑ People
☑ Reference
☑ Science & Technology
☑ Shopping
☑ Sports
☑ Travel + Add Topic Area 893

:: Save Changes

*FIG. 8D*

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

METHOD AND APPARATUS FOR SELECTIVELY SHARING AND PASSIVELY TRACKING COMMUNICATION DEVICE EXPERIENCES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 7,080,139, which issued on Jul. 18, 2006. The reissue applications are application Ser. Nos. 14/577,746, 14/550,100 (the present application), Ser. Nos. 13/894,009, 13/893,992, 12/820,579, and 12/172,518, all of which are reissues of U.S. Pat. No. 7,080,139. The present application is a reissue application of U.S. Pat. No. 7,080, 139, which issued on Jul. 18, 2006, and a continuation of application Ser. No. 13/893,992, filed on May 14, 2013, now U.S. Pat. No. RE45,351, which issued on Jan. 20, 2015, which is a reissue application of U.S. Pat. No. 7,080,139, which issued on Jul. 18, 2006, and a continuation of application Ser. No. 12/820,579, filed on Jun. 22, 2010, now U.S. Pat. No. RE44,324, which issued on Jun. 25, 2013, which is reissue application of U.S. Pat. No. 7,080,139, which issued on Jul. 18, 2006, and a continuation of application Ser. No. 12/172,518, filed on Jul. 14, 2008, now U.S. Pat. No. RE41,450, which issued on Jul. 20, 2010, which is a reissue application of U.S. Pat. No. 7,080,139, which issued on Jul. 18, 2006.*

BACKGROUND OF THE INVENTION

The Internet has opened up new channels of communication and vectors of influence over decision-making. Web sites, peer-to-peer technologies, e-mail and instant messengers are new communication technologies, which have major impacts.

Advertisers and marketers have shown great interest in the influence of these new technologies. However, it is difficult to observe the channels of communication or vectors of influence using traditional market research methods.

Users of the new communication technologies have been particularly quick to embrace instant messengers. Users desire new ways of sharing with friends the experiences they have and discoveries they make using the new communication technologies.

Therefore, there is an opportunity to introduce a new technology, a method and device which provide a new way of sharing experiences, potentially allowing advertisers and marketers to study channels of communication and vectors of influence at the same time.

SUMMARY OF THE INVENTION

The present invention includes methods and devices for sharing communication device usage experiences, including computer usage experiences. Particular aspects of the present invention are described in the claims, specification and drawings.

BRIEF DESCRIPTION OF THE DRAWINGS

FIGS. 8A-8D are aspects of a user interface for administration of a buddy list.

FIGS. [12-14 is] *12A, 12B, 13, and 14 are* flowcharts illustrating the capture of URL related data from a user. The actions illustrated by these flowcharts apply as well to capture of other item or location related data.

Figure 15:
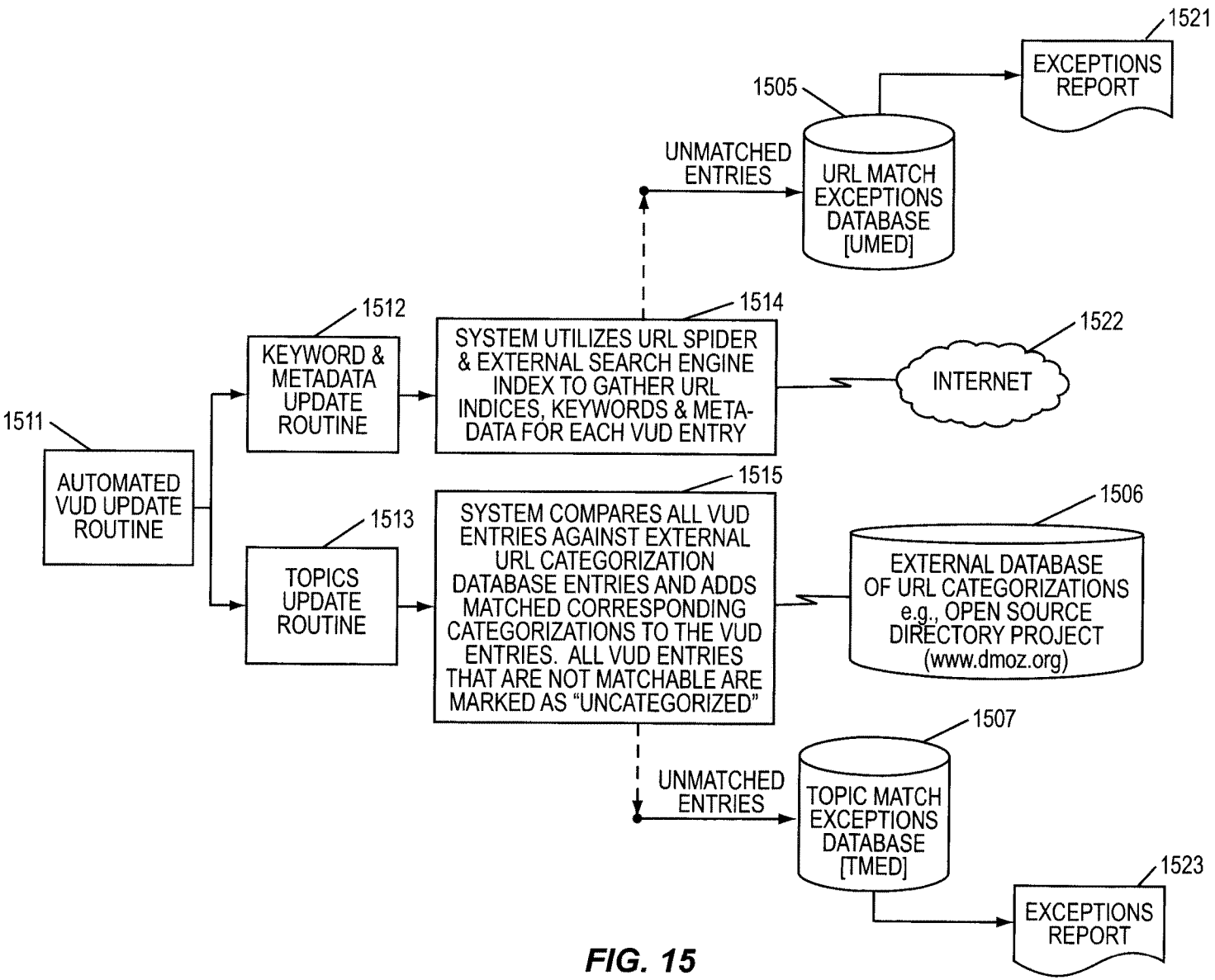

FIG. 15 is a flowchart of automated updating of a visited URL database ("VUD"), with exception processing. The actions illustrated by these flowcharts apply as well to updating of databases reflecting captures of other item or location related data.

Figure 16A:
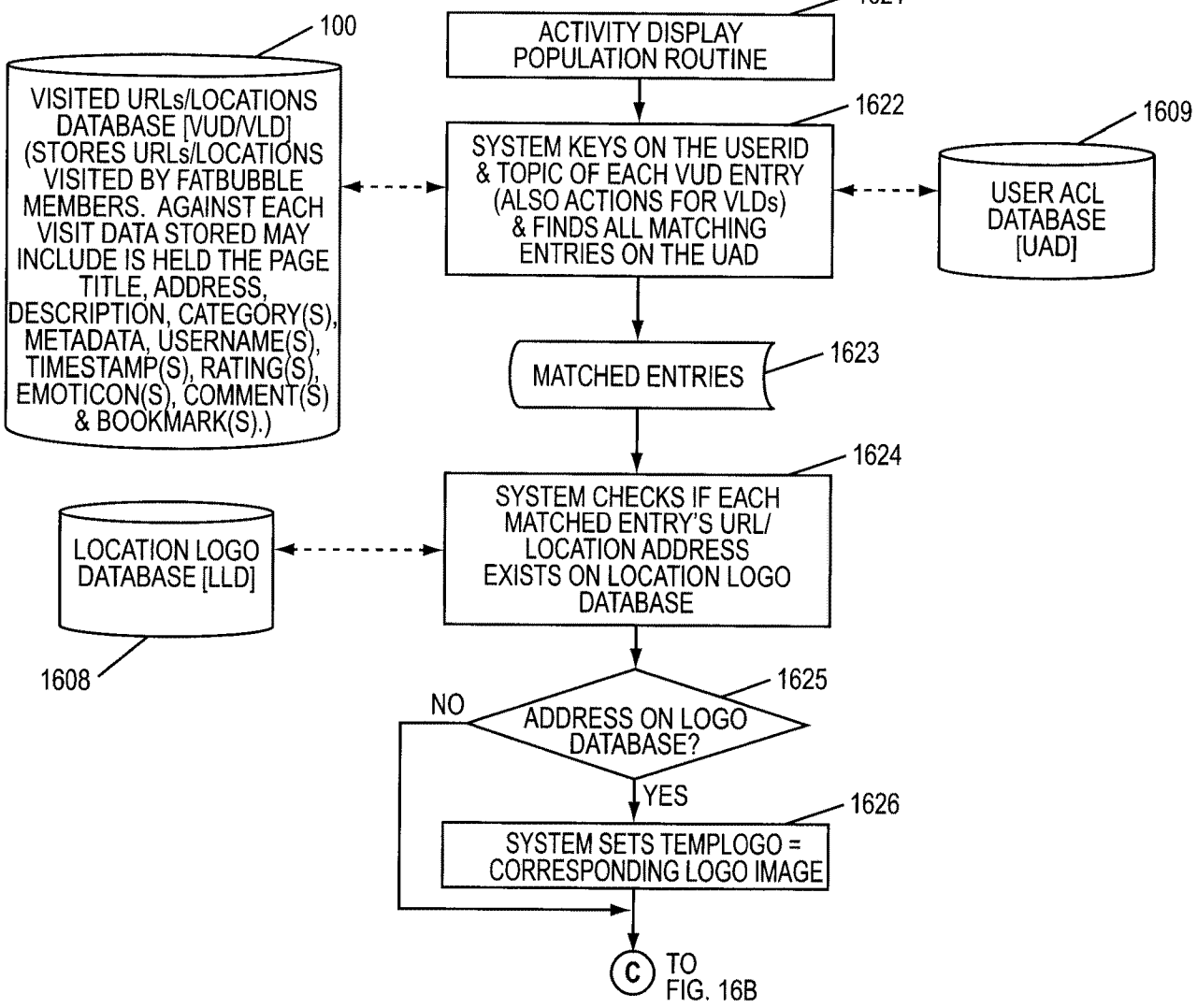
Figure 16B:
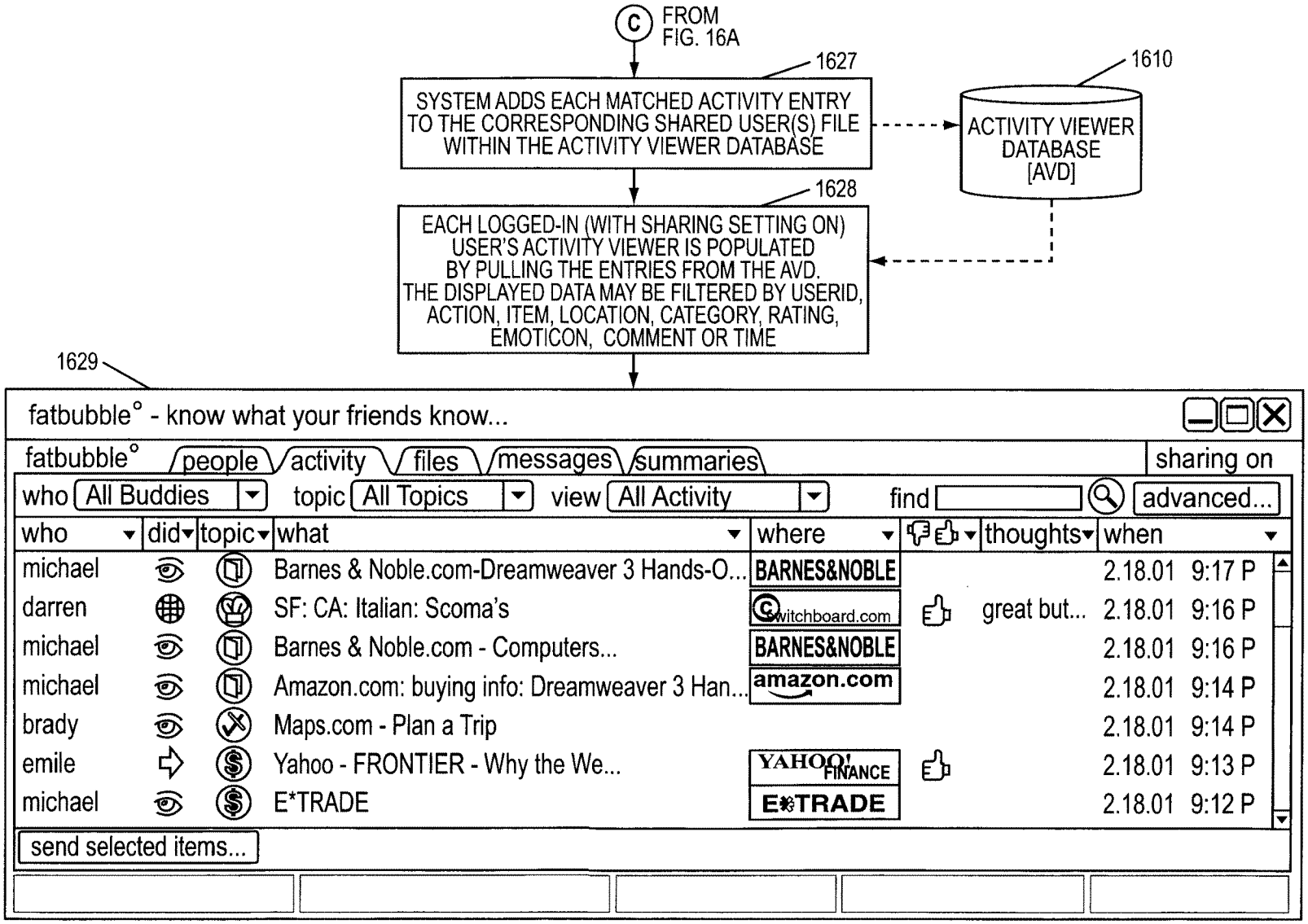

[FIG. 16 is] *FIGS. 16A and 16B present* a [flow chart] *flowchart* of an activity viewer. The actions illustrated by these flowcharts apply as well to viewing of other item or location related data.

Figure 17:
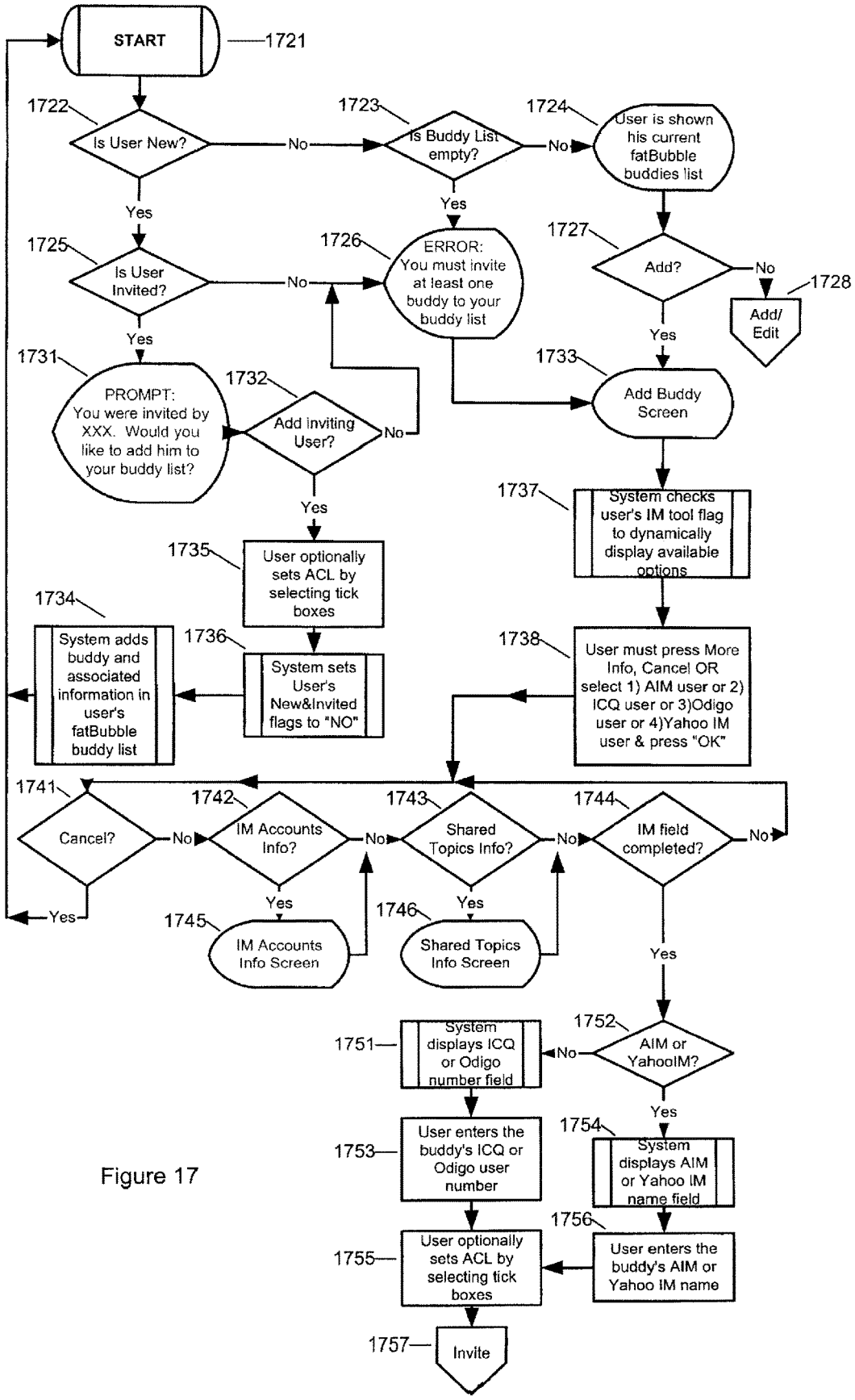
Figure 18:
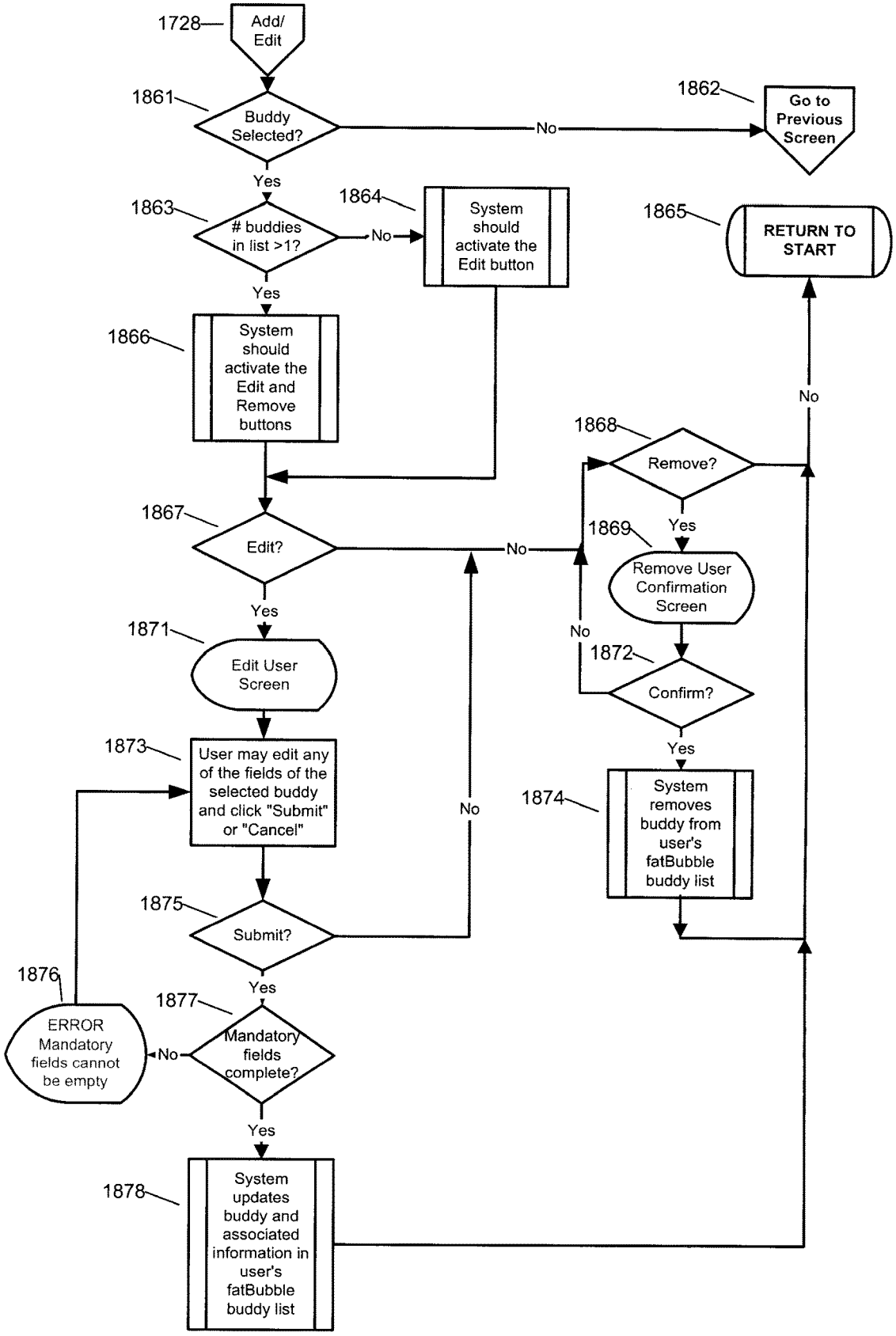
Figure 19:
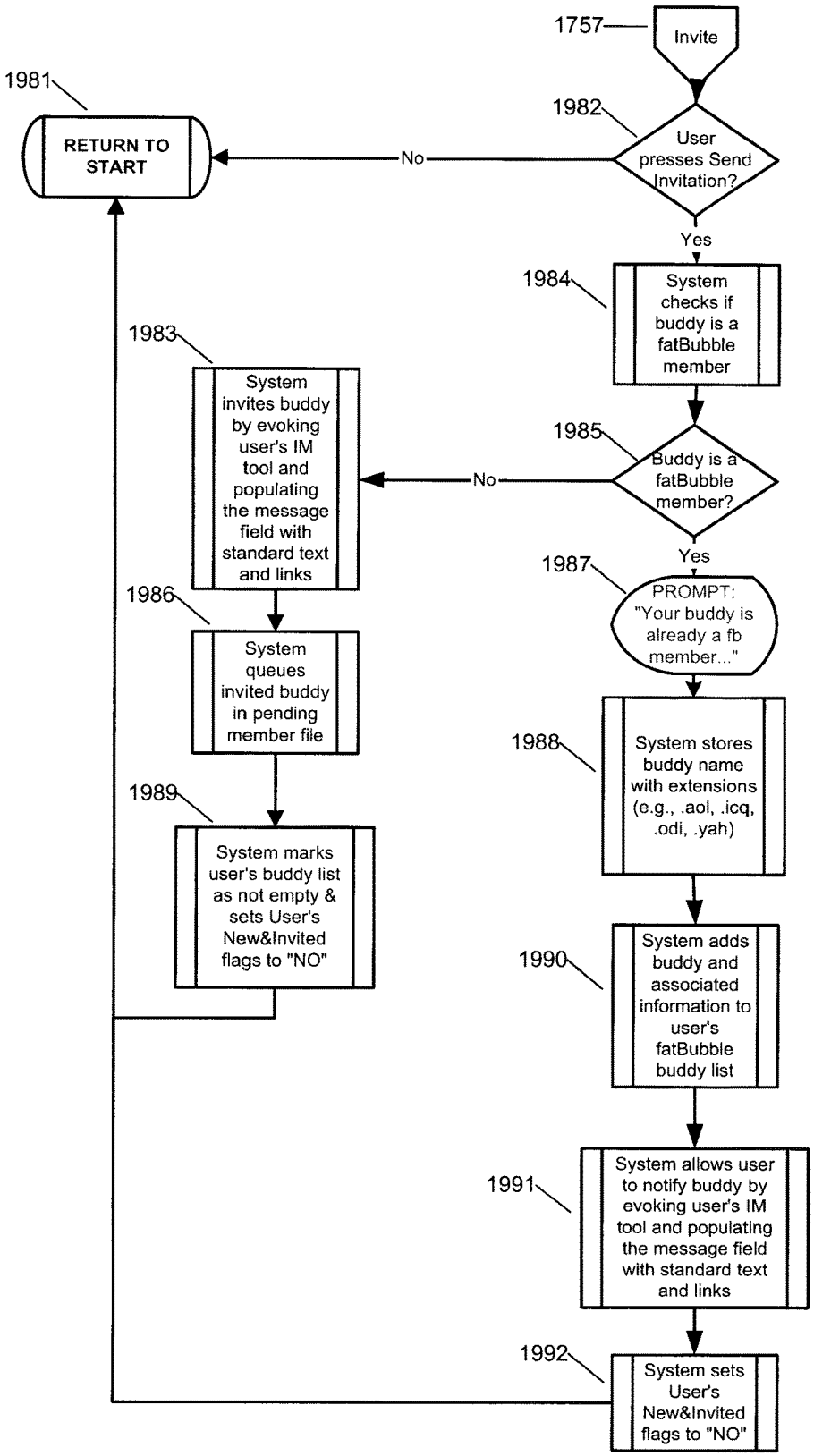

FIGS. 17-19 are flow charts of buddy list and access control list ("ACL") administration.

Figure 20:
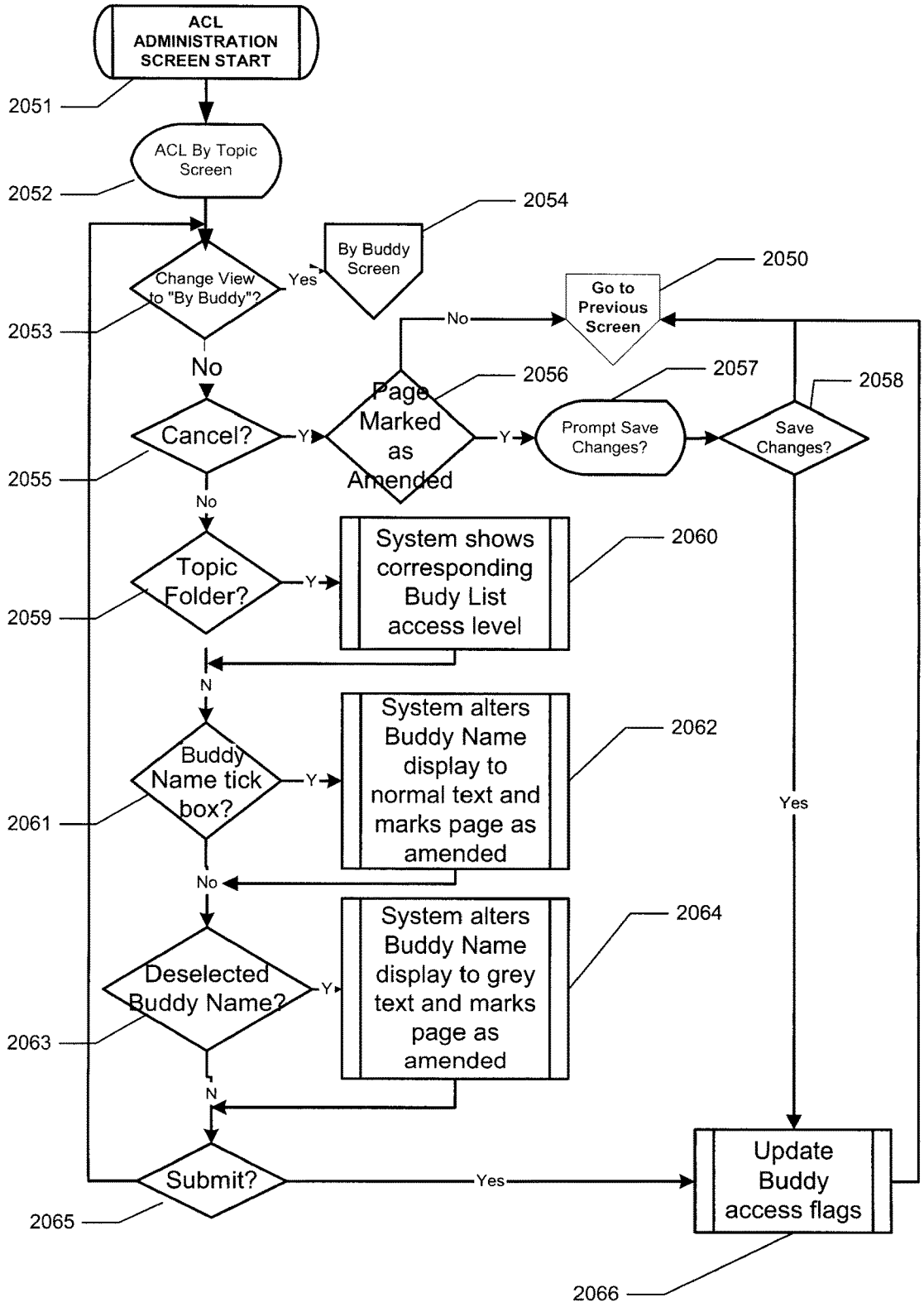
Figure 21:
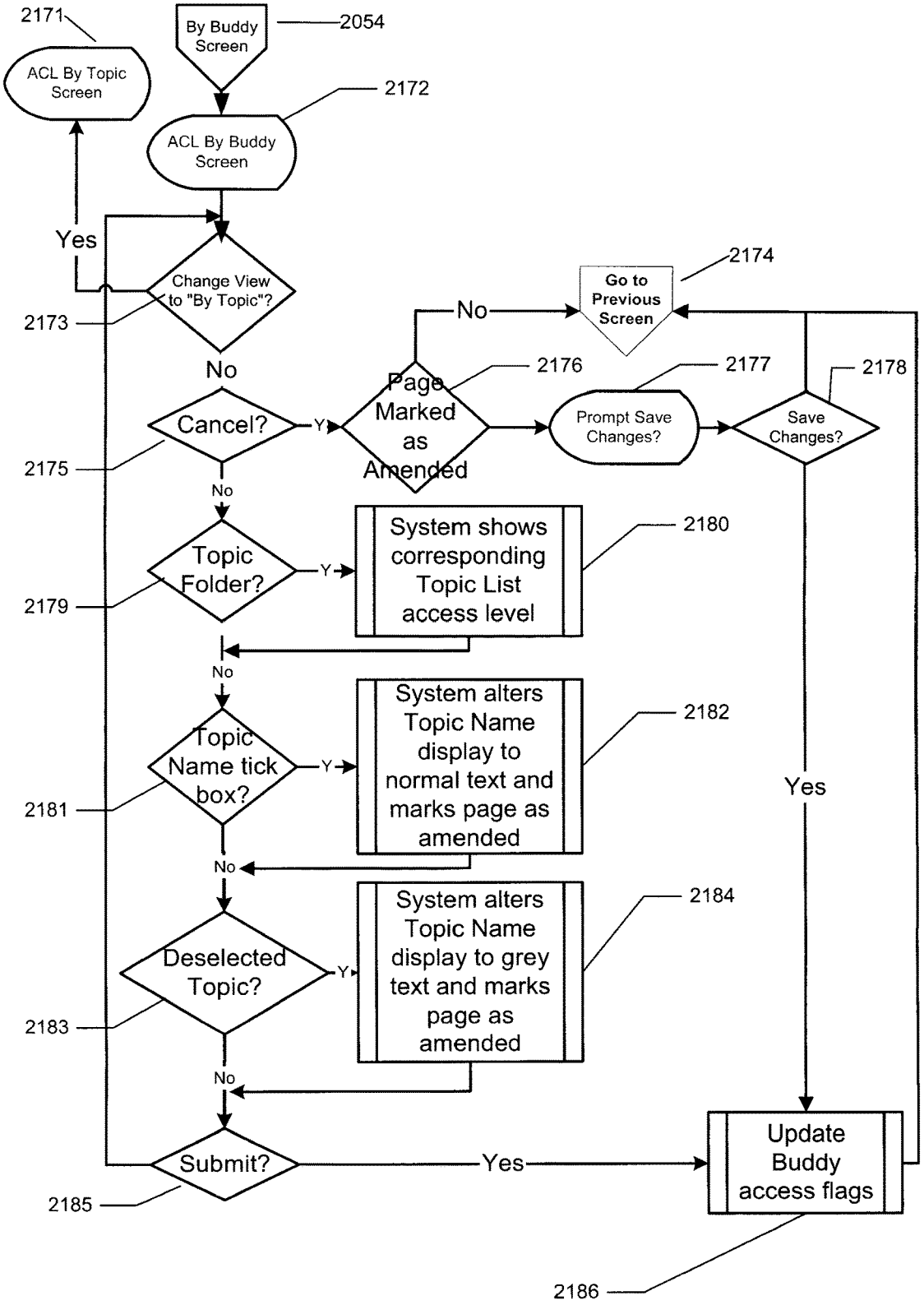

FIGS. 20-21 is flow charts of access control list interface actions.

Figure 22:
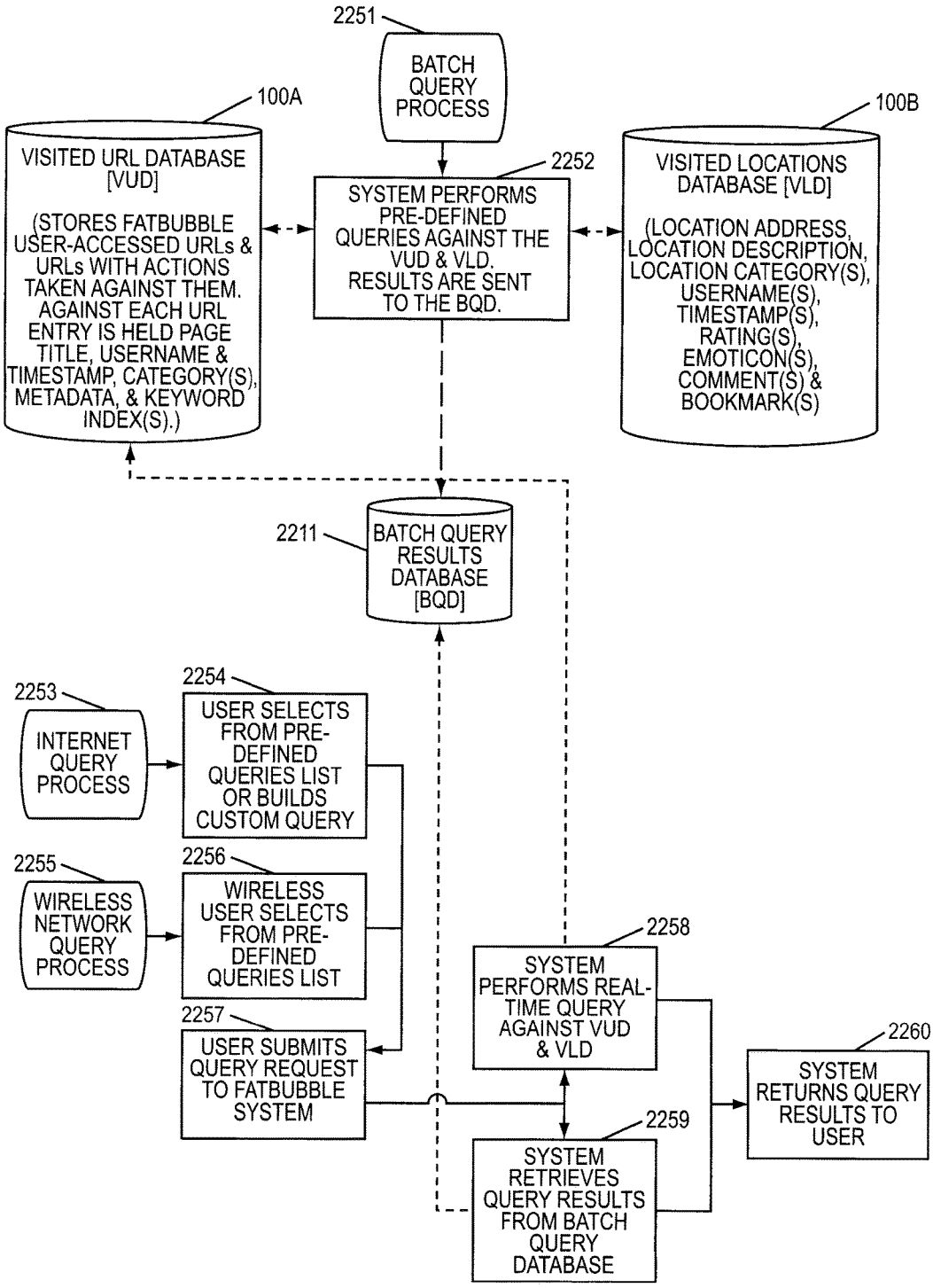

FIG. 22 is a flow chart of the batch and custom query processes.

Figure 23:
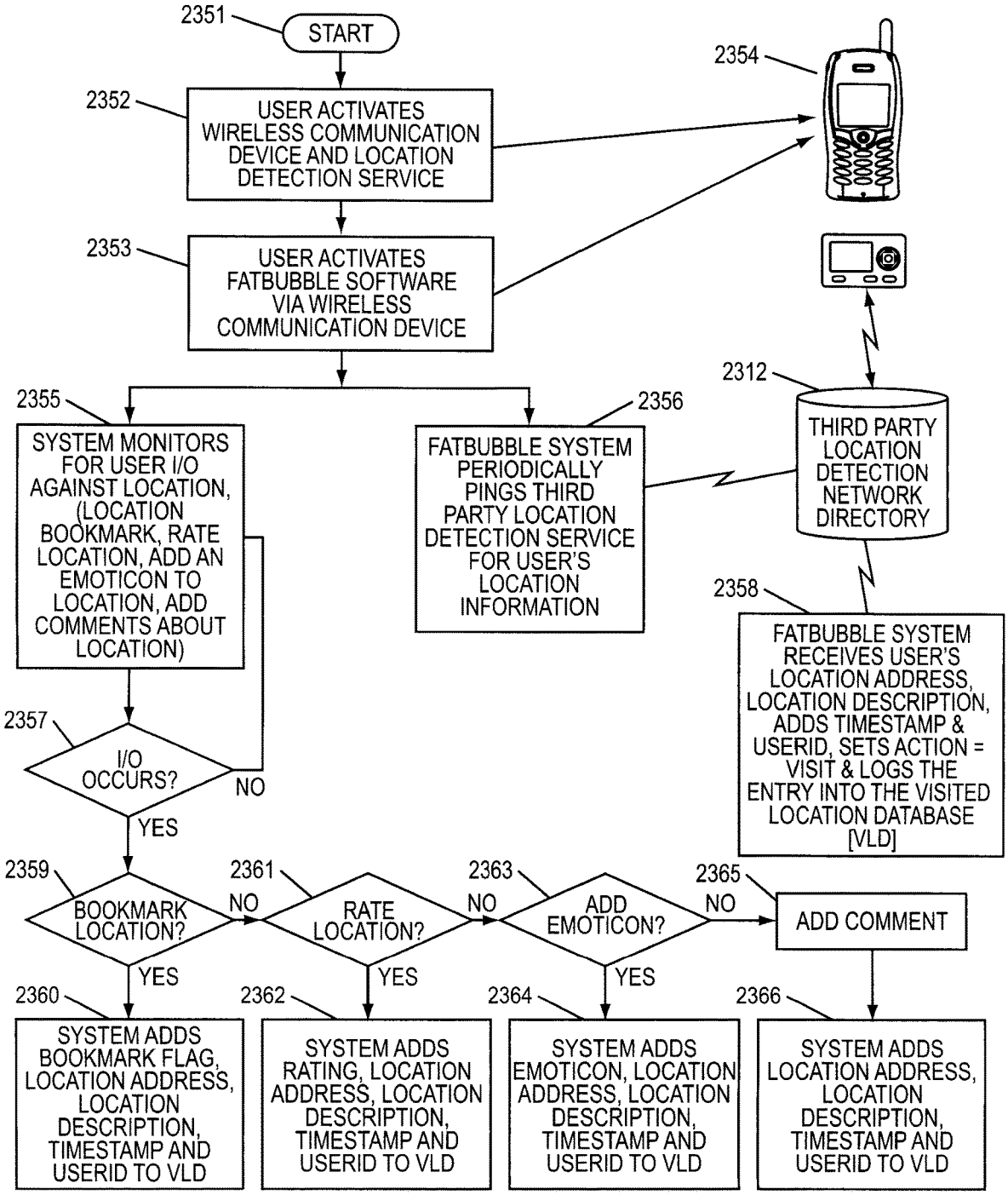

FIG. 23 extends aspects of the present invention to wireless devices, such as cellular telephones and pagers.

Figure 24:
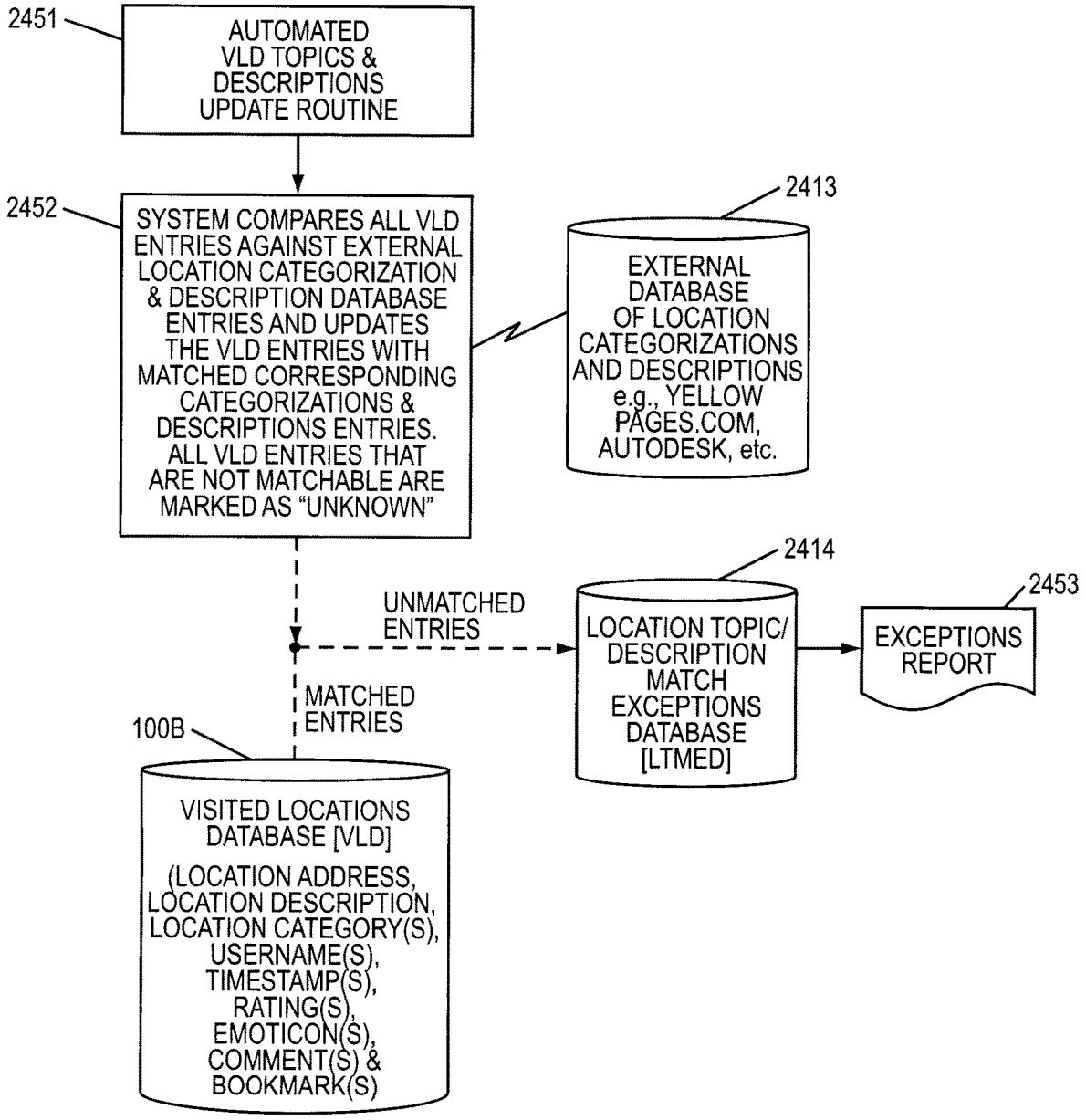

FIG. 24 is a flow chart of populating the visited location database ("VLD").

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

A common theme among aspects of the present invention is collecting data regarding a user's computer usage experience and sharing that data. So-called "buddies" identified on buddy lists of instant messaging products can share selected aspects of their computer usage experiences. Administrative tools and processes can be provided to set up selective collection and sharing of data. Collection tools and processes operate on a variety of computer usage activities and user responses to their computer usage experiences. Processing tools and methods filter, integrate and correlate the collected data. Display tools and processes make portions of the data accessible on a pre-defined basis, such as according to defined rights of buddies. Aggregation tools and processes assemble statistics about user experiences across different bases, such as buddy lists, categories of users, and all service participants.

DATA COMPILED

Aspects of the present invention include building and making accessible various databases and combinations of databases. The databases specifically described below are illustrated in one or another of the figures; reference numbers are provided for ease of reference. One database is a visited URL database ("VUD") 100A. A VUD stores URLs visited by users, or by participants. More generally, a user could visit a web site, listen to or watch content, rate a site or content, assign an emoticon or quick comment to a site or content, send or bookmark a site or content or download data; a VUD entry could result. A rating may be thumbs up or thumbs down or its equivalent, a scaled alpha or numeric rating or its equivalent. An emoticon is an icon conveying a reaction, such as: ":)", ":(", ":\", "=)", "=(", etc. Quick comments may be user defined and later accessible through a menue, ush as a pull-down menu. In addition to URLs, the database stores additional information such as page title, address, description, categories applicable to the URL, metadata, names of users accessing the URL, timestamps of visits, ratings of the URL, emoticons evaluating the URL, comments on and bookmarks to the URL, or keywords for retrieval. The page title, address, description and metadata may be ascertained from visiting the URL itself. With assistance of the URL's author, metadata may include suggested categorization. Alternatively, categorization may be provided by an existing content analysis provider, such as Yahoo or the Open Source Directory Project at www.dmoz.org 1506. A further alternative is that content could be categorized by a service provider or other sponsor, either for web content or for intranet, extranet or other network content.

Another database used to practice aspects of the present invention is the visited location database ("VLD") 100B. A VLD stores similar information for locations visited by users or participants carrying portable devices. For instance, a Bluetooth equipped cell phone or pager could interact with a location that a user entered. Walking in the door of a popular restaurant, nightclub or other location could trigger an interaction between a Bluetooth device and a Bluetooth access point sponsored at the location. The Bluetooth device could learn the location visited and report that location immediately or later when the device returned to the proximity of a home access point or the device docked with a home access point. Alternatively, the Bluetooth device could disclose its identity to a Bluetooth access point at a particular location and the access point could report the visit. The user of the Bluetooth device could have the same options for providing additional information regarding the location, as for URLs. The VLD also could store geographic information regarding the location. such as geo-coded data. Several equivalent methods of associating a portable device with a location are available. Sophisticated networks may fingerprint, triangulate or otherwise locate a wireless device based on radio signal characteristics. Sophisticated devices may include circuits that determine the device's location; these circuits may utilize GPS, DGPS, Loran or any other location fixing protocol. The physics of how the device and the location are associated are relatively unimportant; an independent service may be used to track locations visited by a user based on any of the protocols identified above or any other protocol.

The VUD and VLD databases are readily extended to a visited item database 100, which could include items on a computer, intranet, extranet or any network. These items may be data such as multimedia files, XML documents, database searches or virtually any other material. One distinction between practicing aspects of the present invention and general database processing is storing user-based information, such as the user's pattern of visiting and the user's rating, emoticon or comments regarding an item and making stored, user-based information available to buddies. Collectively, VUDs, VLDs and visited item databases can be referred to as VXDs. Reference to one of the three VXDs is intended to refer to all three, unless the context makes it clear that only one of the three applies.

Access control lists ("ACLs") 102, 103, 104, 1609 also can be maintained as databases. An ACL identifies buddies and controls their access to VUD, VLD, visited item and other activity-related data. A user could set up his or her own ACL via buddy list and access control list administration functions. An enterprise could set up ACLs for enterprise users. ACL-like data complied for instant messaging products could be accessed and utilized to compile ACLs for users or enterprises.

A URL logo database ("ULD") 101 can be useful for associating logos with web sites. The logos may be sponsors, advertisers or others who provide support for operation of a service practicing aspects of the present invention.

Item categorization for VUD, VLD or visited items can generate exception databases, such as an item match exceptions database (for instance, a URL match exceptions database ("UMED") 1505) or a topic match exceptions database ("TMED") 1507. These exception databases record data which require further attention after initial processing to update the VUD, VLD or a visited item database.

An activity viewer database ("AVD") 1610 can store information associating particular users with URLs, locations or items. Raw data regarding user activity is filtered and matched with entries front the VUD, VLD or visited item database to create the AVD. The AVD holds users' activity parsed into a format for display via the Activity Viewer. It includes the activity, internal flag settings, the URL, the page title, the logo, the username, the timestamp & category for an entry. If a user filters the display of data on the Activity Viewer, data is pulled from this database.

Batch query results can be stored in a database, a "BQD" 2211. Pre-defined queries can be run against the VUD, VLD or visited item database. For instance, top 10 hits, top 50 hits or top 100 hits in a wide range of categories are most efficiently recalculated periodically on a batch basis, rather than in response to ad hoc inquiries.

Third party location detection data can be stored in a detection network directory 2312. Third party data can be provided as received, on an interrupt-like basis, or in response to periodic requests, on a polling or batch basis. Location categorizations and descriptions 2413, e.g., YellowPages.Com, AutoDesk, etc. can be used to provide supplemental information about locations.

Location/topic entries which require further attention, after processing to update the VLD, can be stored in another match exceptions database, a "LTMED" 2414.

One aspect of practicing the present invention can include tying into a user's instant messaging products or, more generally, into the user's messaging facilities. For instant messaging ("IM"), users or participants typically set up so-called buddy lists. Other users or participants agree to participate in instant messaging. One IM user can send an instant message to another IM user, if their IM products are compatible. The two can carry on a dialog or a so-called "chat". More than two users may be included in a real-time chat, when the instant messaging product allows multiple participants. Examples of instant messaging products include AOL's Instant Messenger software, MSN Messenger software, Yahoo! Messenger software, America Online's ICQ software, Odigo's instant messenger software and Jabber's instant messenger software. Reciprocal inclusion on buddy lists typically involves a closer relationship between participants than inclusion on an e-mail mailing list or directory, but tins is not necessarily the case. Buddy lists sometimes are shorter and more selective than general messaging lists or directories.

The present invention also may be applied to a user's messaging facilities by selectively enabling others listed on a general e-mail or messaging list or directory to participate. Selectively enabling others limits the intrusion on a user's privacy and limits various administrative (e.g., setup and administration) and responsive (e.g., junk mail) burdens. Alternatively, group functions used for other e-mail or messaging purposes can be a basis for defining rights to sharing of activity data.

OVERVIEW AND USER INTERFACES

Figure 1:
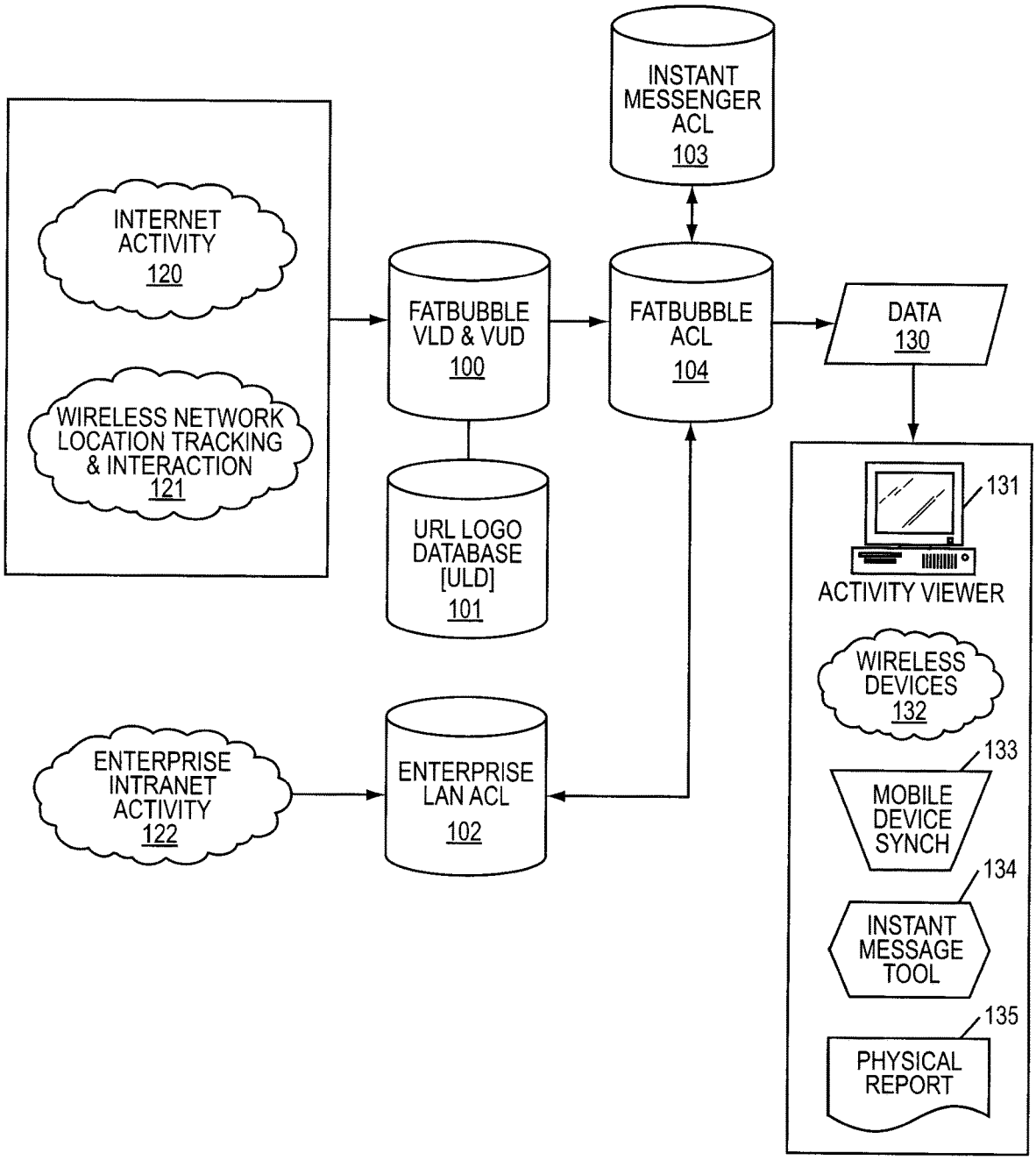
FIG. 1 is a block diagram of interrelated components of systems practicing aspects of the present invention.

FIG. 1 is a block diagram of interrelated components of systems practicing aspects of the present invention. Tracked activity may include Internet activity 120, wireless network location track and interaction activity 121 and enterprise intranet activity 122. Activities tracked in these domains may include view, listen, rate, comment, assign emoticon, send, watch, download, bookmark or visit. A user views a URL, watches a visual presentation and listens to an audio presentation. A user visits a restaurant or other location. A user who views, watches, listens or visits may respond to their experience. A user's response may be to rate, comment, assign an emoticon, send information to a buddy, download data or bookmark an item for later access.

Data stored regarding an experience may include VUD, VLD or VXD databases 100, a logo database for URLs, locations or items 101 and a variety of ACL databases. The access control lists can be maintained at the service provider level 104, the enterprise level 102 or the individual user level 103.

Data 130 reflecting individual experiences and aggregated experiences can be accessed or reported in a variety of ways. An activity viewer running on a user's system 131, either fixed or portable, can appear in a window. Reports on locations, either the experiences of others visiting the location or the proximity of buddies or buddies of buddies can be reported automatically to Bluetooth enabled wireless devices 132 when such devices reach a location or are in contact with a location-sponsored Bluetooth access point. Wireless devices can be synchronized 133 when reasonable bandwidth is available to retain data that would be too voluminous to access via a low bandwidth connection. The interfaces of instant message tools 134 can serve as an output channel, as licensing arrangements become available. Physical reports 135 can be printed for analysis. These reports can cover analysis of interactions among participants and spreading of information from one user to others.

Figure 2:
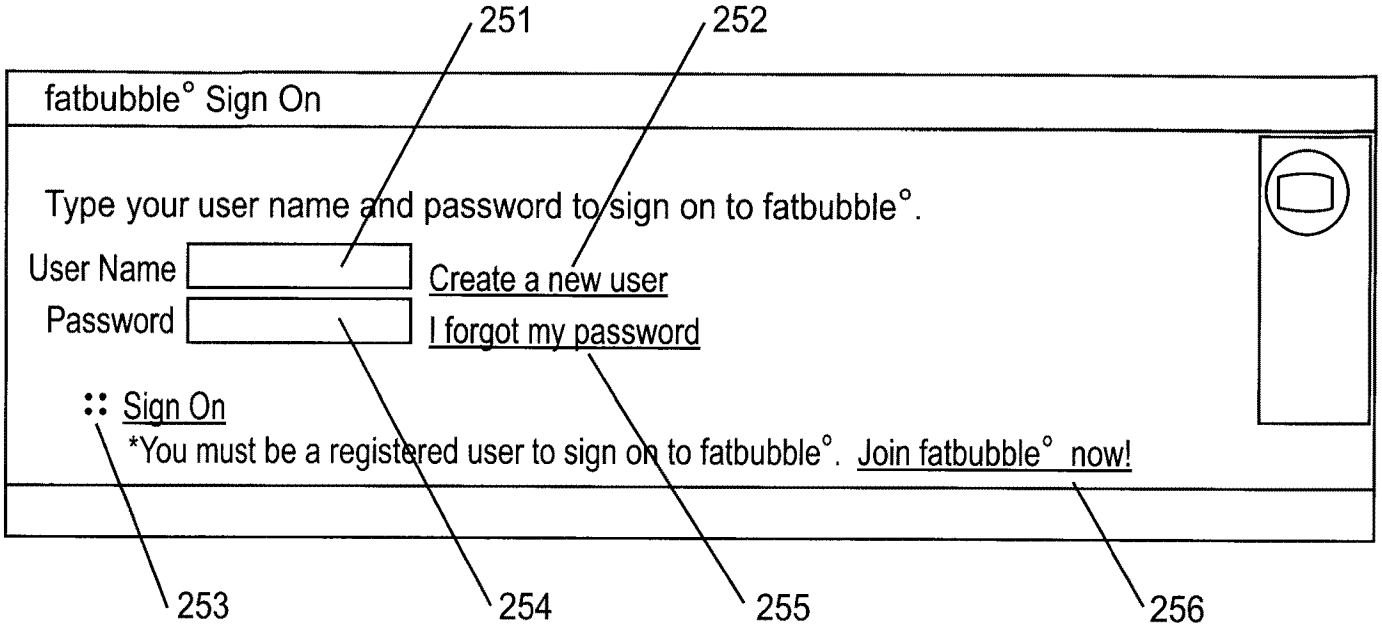
FIG. 2 is a user interface for logging in or creating a new account.

FIG. 2 is a user interface for logging in or creating a new account. In one embodiment, separate fields can be provided for user name 251 and password 254. In other embodiments, these fields could be combined. After filling in identification data, a user may select a sign on link 253 or press the enter, return key or other key or may take another action such as speaking a command or winking an eye, which triggers processing of the completed fields. A link is provided for creating a new user 252, which may be on demand or subject to an approval process. A new user can either be a new name for a registered user or a new registration. A user who forgot their password may use one of the commonly employed password recovery schemes, by selecting a forgotten password link 255. An additional link for new user registration is provided 256. In one embodiment, the system implements a strict, anonymous access privacy policy and does not collect any information about the user which could be used for identification of the user or compilation of a database of user-identified activities. In another embodiment, the user can chose the amount of information that the user provides and corresponding services that are enabled by providing information such as an e-mail address. In this second embodiment, the system can publish a range of privacy policies, including a default, and ask the user to opt-in to a specific privacy policy, which may include providing the user's name or e-mail address to a handful of select vendors that have products responsive or keyed to the user's shared activities.

Figure 3:
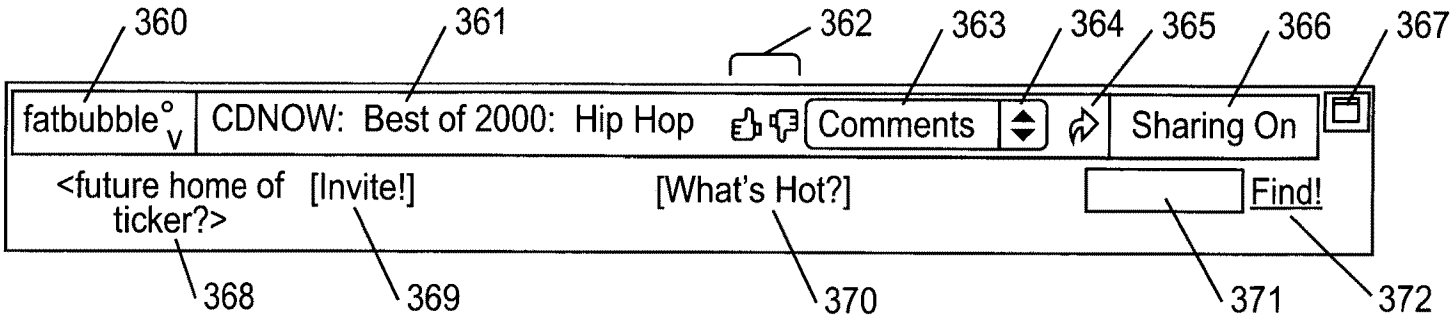
FIG. 3 is a user interface for providing access to system features.

FIG. 3 is a user interface for providing access to system features. The embodiment illustrated is a relatively low profile access window. A lower profile access window can be provided via an icon that is visually accessible, such as a floating menu bar having an always on top attribute or an icon in a system tray. Pressing a hot key is an alternative way to bring an access window into view. The access window illustrated in FIG. 3 has many features, which can be included in a wide variety of combinations. The service provider logo 360 doubles as providing access to features not immediately visible. These features may include maximize, minimize, quit or selection of a particular display format. A current selection 361 identifies a current context, such as viewing an aggregated list of the best Hip Hop music of 2000. Rating choices 362 such as thumbs up and thumbs down or emoticons allow a user to instantly express their view regarding the current context with a simple action, such as a single click of a mouse. A user who wants to say more about their experience can select a comments button 363 to activate a window for entering comments. A scroll button 364 also supports entry of free form comments, definition of user comments, selection from among user comments, or selection of emoticons, either system supplied or user defined emoticons. When the scroll button 364 is used, the default item may change from "comments." Other button choices 363 can be provided to a user, in addition to comments, such as emoticons or sending the current context to one or more buddies. A send button 365 is immediately accessible and activates a window for selecting recipients of information from the current context. The current context may be a list or a particular item, either front a hit list or the like or from the user's own activities.

The sharing status toggle 366 allows a user to turn sharing on and off. When sharing is on, rights defined in the ALL provide access for buddies to the user's activity. When sharing is off, the user's activity will not be shared with buddies. However, the user's activity may still be recorded to a tracking server either for aggregation or to be associated with the user but not reported to buddies. The user's options or access to information may be limited when sharing is off, tending to encourage the user to leave sharing activated. The window maximize control 367 allows direct access to maximizing the window to a pre-selected format.

Other aspects of this interface include space for a banner 368 (either static or moving), an invite button 369, a hot list access 370, a search entry window 371 and a search button 372. The banner could be used to generate advertising revenue. The invite button 369 provides access to an invite interface such as FIG. 4. The hot list access 370 provides access to one or more options and access formats for aggregate ratings of items. The ratings may reflect the frequency of access to an item or rating scores assigned by users. The rating scores may be thumbs up/down or any of the other scoring approaches mentioned above. The search entry window 371 accepts text and logical connectors. The find button 372 can be implemented to search titles of items accessed by participants, content of such items, the Internet, an intranet or another domain of interest.

Figure 4:
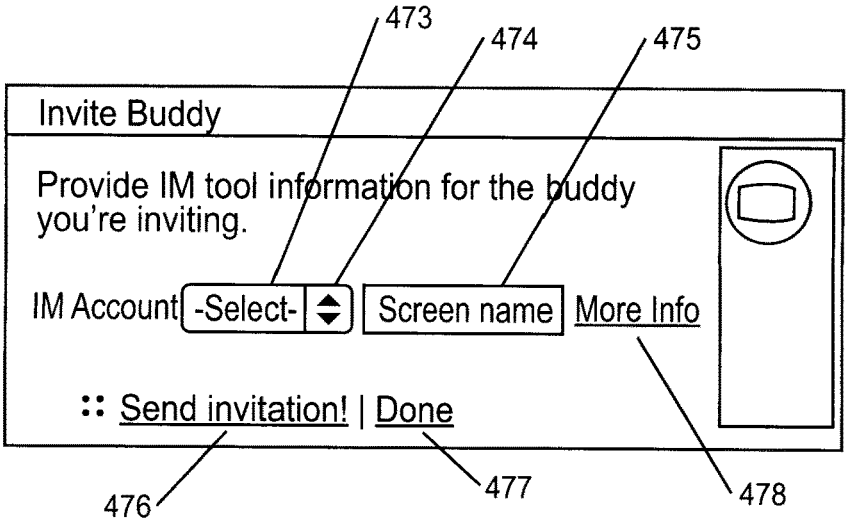
FIGS. 4 and 5 are user interfaces for inviting a "buddy" to join in practicing aspects of the present invention.
Figure 5:
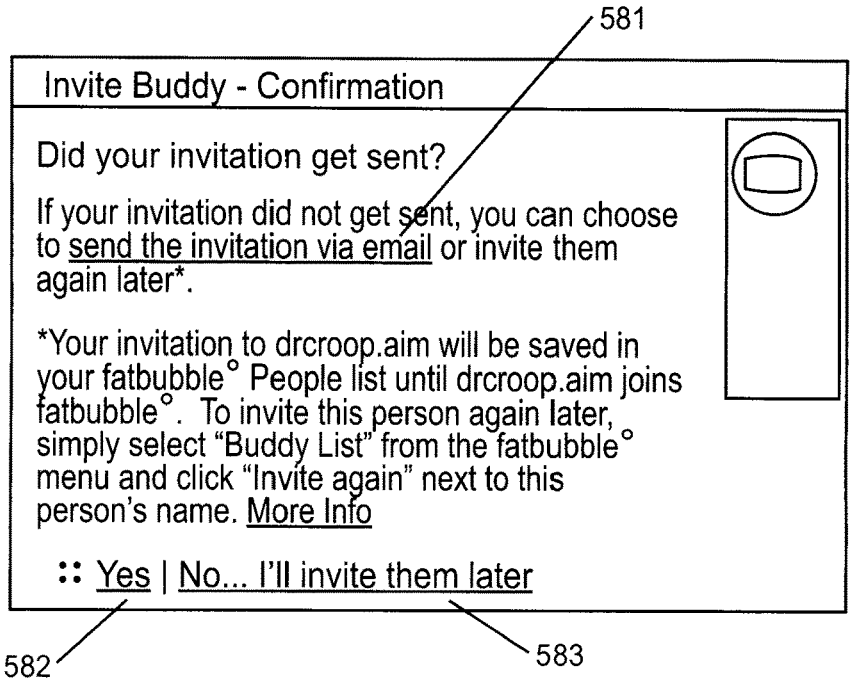

FIGS. 4-5 are aspects of an interface for inviting others to become buddies. FIG. 4 is one of many possible initial invitation interfaces. An instant messaging select button 473 allows a user to identify an instant messaging product which maintains a list of buddies who can be invited to join a group. In some implementations, such as an enterprise implementation. a network directory such as a Novell, NT or Windows 2000 server directory of users may be accessed instead of an instant messaging product. In other implementations, an e-mail system user directory may be accessed for users to invite. Group membership for enterprise implementations alternatively may be administered by a security department, instead of individual users. A scroll button 474 allows a user who has more than one source of lists, such as more than one instant messaging product, to select the user to be invited. The screen name window 475 accepts a text string. It may provide assisted field completion, including a list of near matches. For some implementations, such as AIM or Yahoo IM, the screen name may be a name. For other implementations, such as Indigo and ICQ, the screen name may be a number which ties to a name, which may be locally unique or not unique at all. These alternatives are further presented in the discussion of FIG. 17, below. A send button 476 triggers transmission of an invitation to the identified buddy or other potential participant. The transmission may include a text message delivered by the instant messaging tool with a hyperlink for the recipient to sign up. The done button 477 signals that the user is done inviting buddies. A more information button 478 provides a help function.

FIG. 5 is an invitation follow-up interface. In some embodiments of the invitation process, there is no feedback from the instant messaging tool to an invitation process. The invitation process may query the user to determine whether an invitation was sent successfully. This interface provides a user with three alternative responses. If the instant message transmission was successful, the user indicates "yes" 582. If the user attempted the instant messaging invitation, but the buddy was not available, the user may press the e-mail link 581. Alternatively, the user may elect to invite the buddy again later 583. Then, the buddy's name will appear on a buddy administration list (FIG. 8A) with a link such as "resend invitation." The system may allow a user to clink on an entry in a list and resend the invitation, preferably when the invitee is on line. In other embodiments or using other instant messaging products, the IM product may assure delivery of the message when the recipient is not instantly available. Yet another approach is for the IM product to provide direct feedback to the activity sharing processes, so that an invitation or other follow-up interface appears only when needed and so that the user never needs to confirm that an invitation or item was successfully sent.

Figure 6:
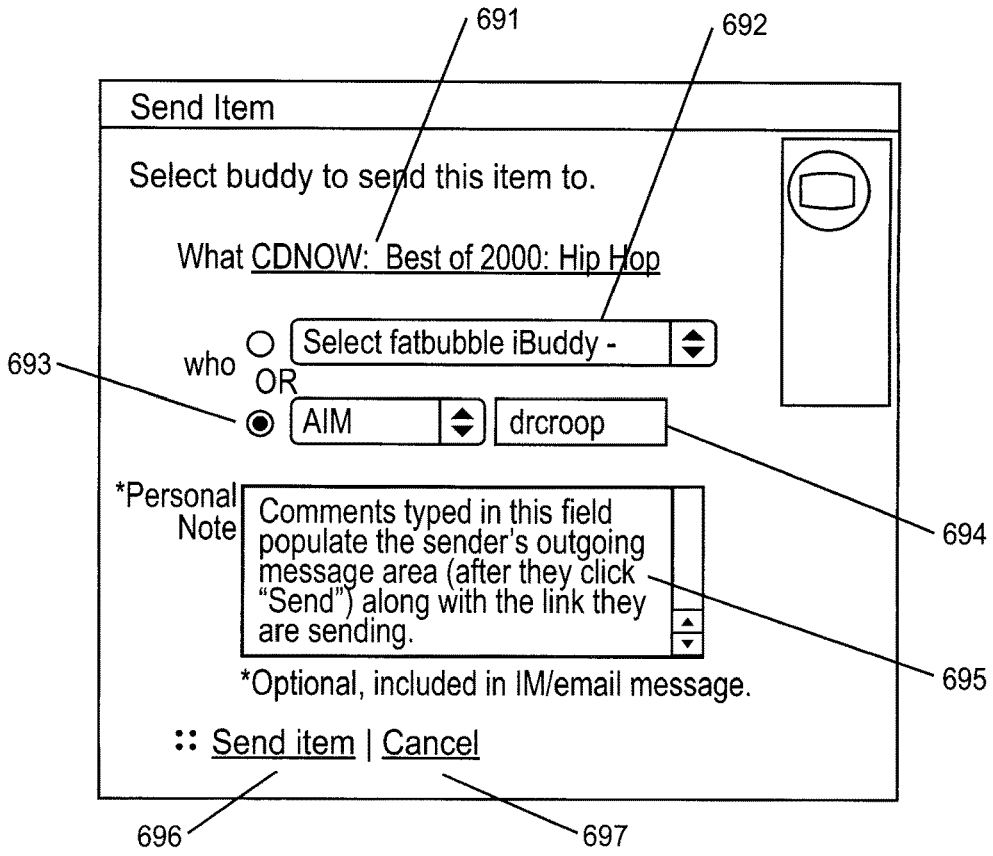
FIGS. 6 and 7 are user interfaces for sending a buddy an item.

FIG. 6 depicts an interface for sending an item to a buddy. This interface may be invoked, for instance, by selecting the send button 365. The item being sent is identified 691. The item identification 691 may be linked to the item, a pulldown menu of items recently viewed or recently sent, or to a dialogue for selecting an item to send. The user selects between sending the item, a link to the item or other item-related information to a buddy who has enrolled to share activity data or to a person listed as an instant messaging buddy. In an enterprise implementation, as described above, the user might select an addressee from a network registry of users or an e-mail list. A personal note 695 may be sent along with an item. The system may be configured so that the personal note is not retained on the tracking server or so that it is retained. The send item button 696 signals that the items should be sent. The cancel button 697 indicates that the item is not to be sent. Either the send or cancel button can be accompanied by a confirmation screen.

Figure 7:
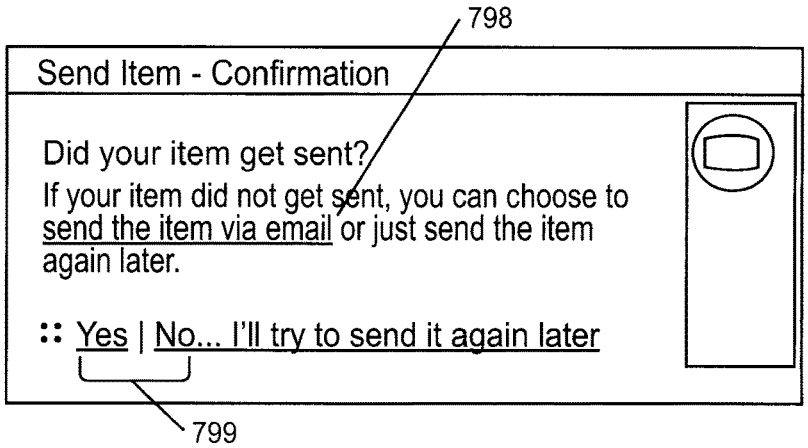

FIG. 7 is a confirmation interface for items sent. The three choices are as in FIG. 5: to confirm that the message was sent 799 "yes"; to resend the item by e-mail 798; or to queue it to be resent later 799 "later."

Figure 8A:
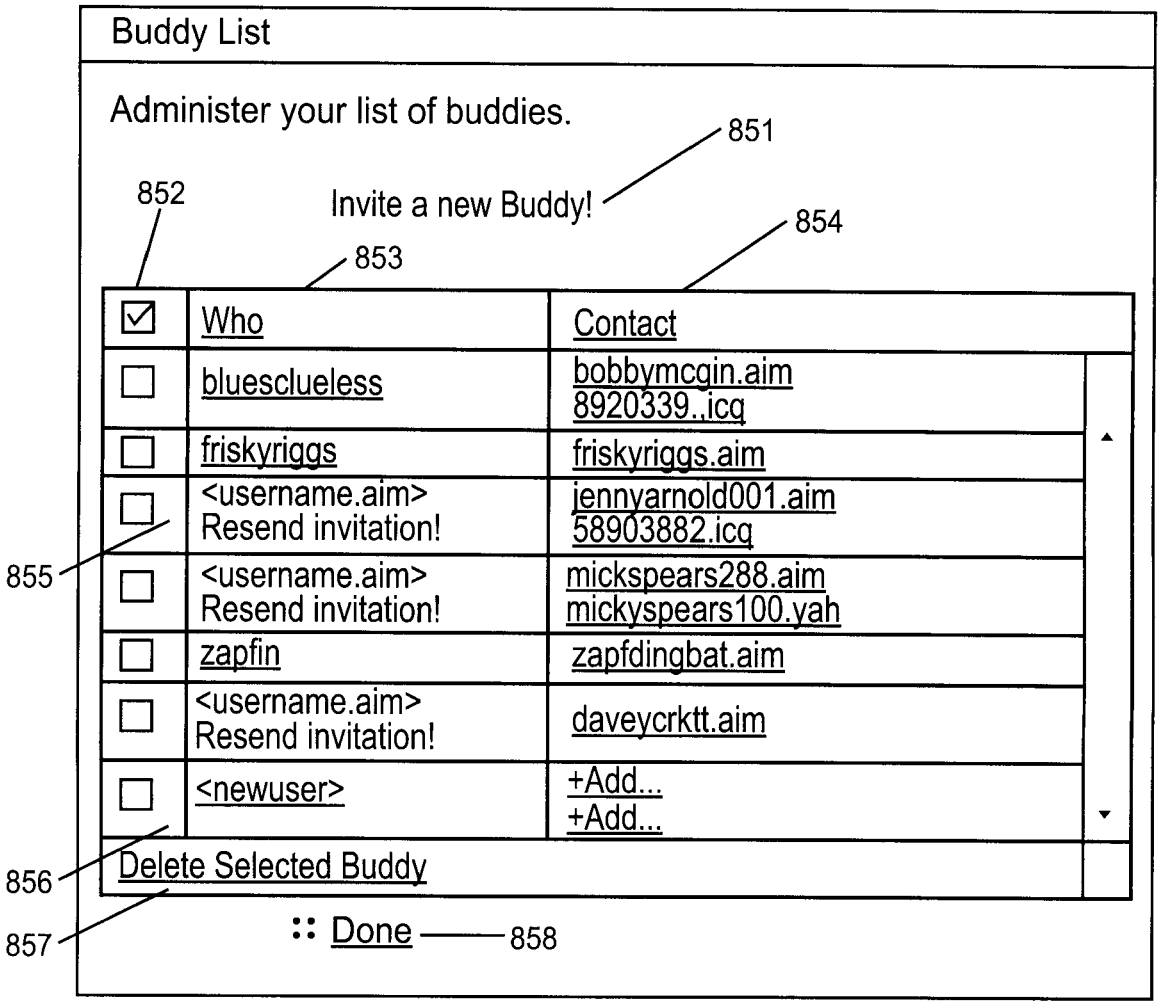

FIGS. 8A-8D depict interfaces for administration of buddy lists. The embodiments depicted are adapted to integration with instant messaging products. Slightly different embodiments would be better adapted to e-mail or other types of messaging facilities, such as Lotus Notes. FIG. 8A depicts one embodiment of a buddy list. A link is provided 851 for inviting a new buddy. An alternate link for adding a user may appear in the list of buddies 856. The columns provided in this embodiment include a tick box 852, a buddy name 853, and one or more instant messaging contact links 854. The tick box 852 may be used to delete several selected buddies. The buddy name column 853 includes both buddy names and options to resend an invitation or add a new user. The buddy names may be active links which lead to additional interfaces, such as those depicted in FIGS. 8B-8D. The contact column 854 lists one or more instant messaging contact links. The extension following the link may identify a particular instant messaging tool. The link may be in the form of the user ID applicable to a particular instant messaging tool. This interface also includes a link for deleting selected buddies 857 and for indicating completion of buddy list administration 858.

Figure 8B:
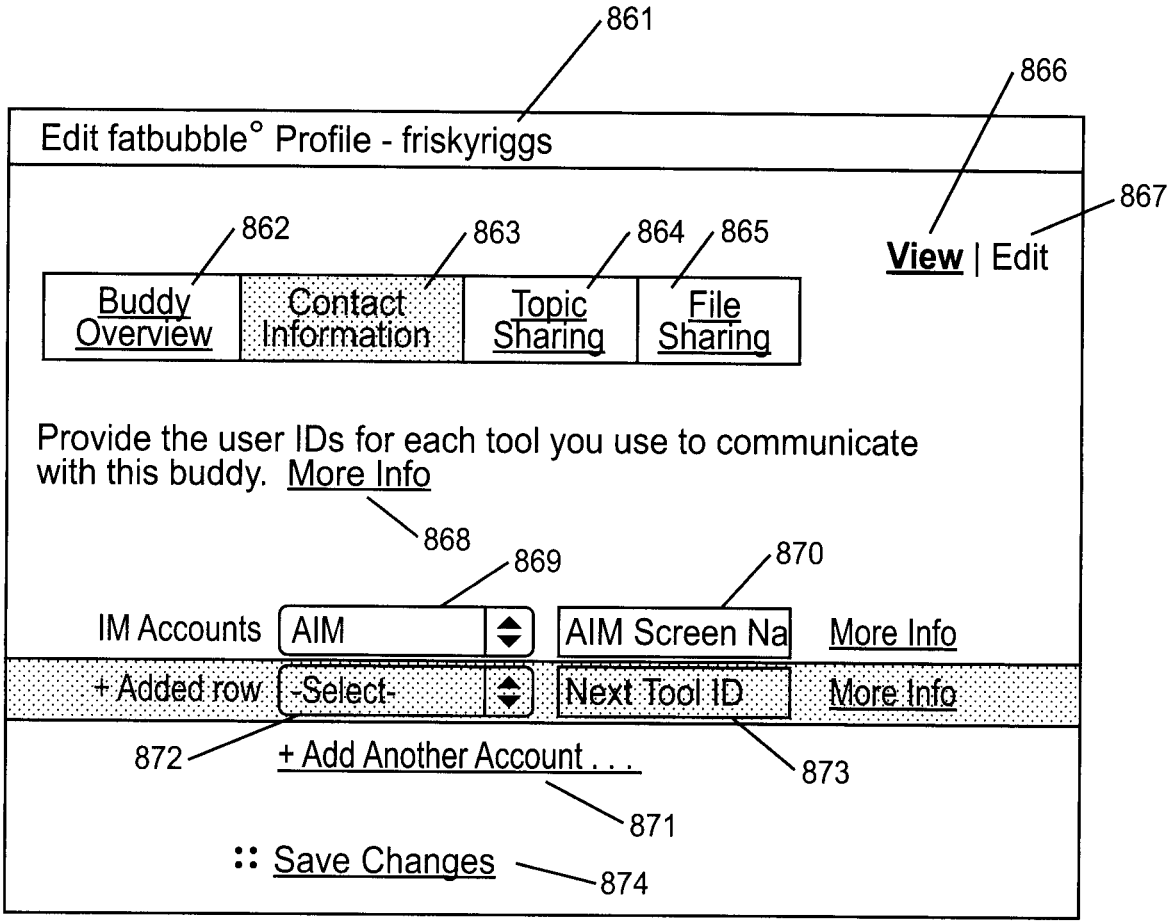

FIG. 8B is another of the buddy list administration interfaces. The name of the buddy being profiled appears as a header 861. Optionally, a group of buddies may be administered. Related buddy administration screens include a buddy overview screen 862, contact information 863, topic sharing rights 864 and file sharing rights 865. The user may either view 866 or edit 867 information regarding a buddy or group of buddies. More information can be obtained by clicking a link 868. For particular buddy, a particular instant messaging tool is selected 869 and instant messaging ID is entered or selected 870. When a buddy has more than one instant messaging tool or ID, a user may select a link for adding additional links 871. The interface adds more rows, including more options for instant messaging tools and messaging ID's 872, 873. More than one instant messaging ID may be assigned to a buddy for a particular instant messaging tool. When the contact information is complete, the user selects the save changes link.

Figure 8C:
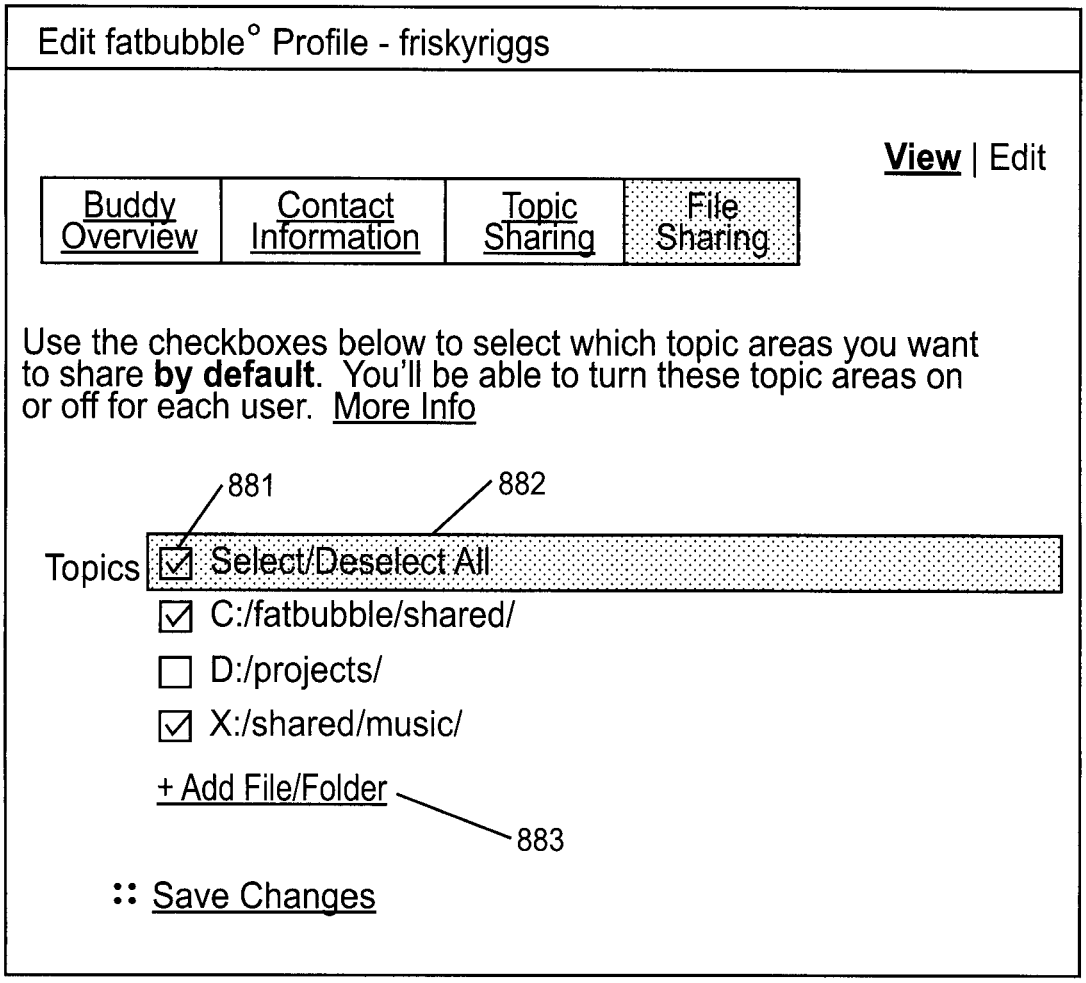

FIG. 8C uses tick boxes to select files or folders to be shared by default. Both default and particular user or user group administration is supported. Tick boxes 881 and directory or file names 882 can be used. Additional files or folders can be added to a list 883. Alternatively, a Windows Explorer-style file directory tree can be used to select files and directories, as is done for backing up and restoring files or directories. Additional fields and links in FIG. 8C have the same placement and usage has in FIG. 8B.

FIG. 8D is a topic sharing interface. Both default and particular user or user group administration is supported. Tick boxes 891 and topic or sub topic names 892 can be used. Additional topics can be added to a list 893. Alternatively, a browser-style bookmark tree can be used to select topics. Additional fields and links in FIG. 8B have the same placement and usage as in the previous figures.

FLOWCHARTS

Figure 9:
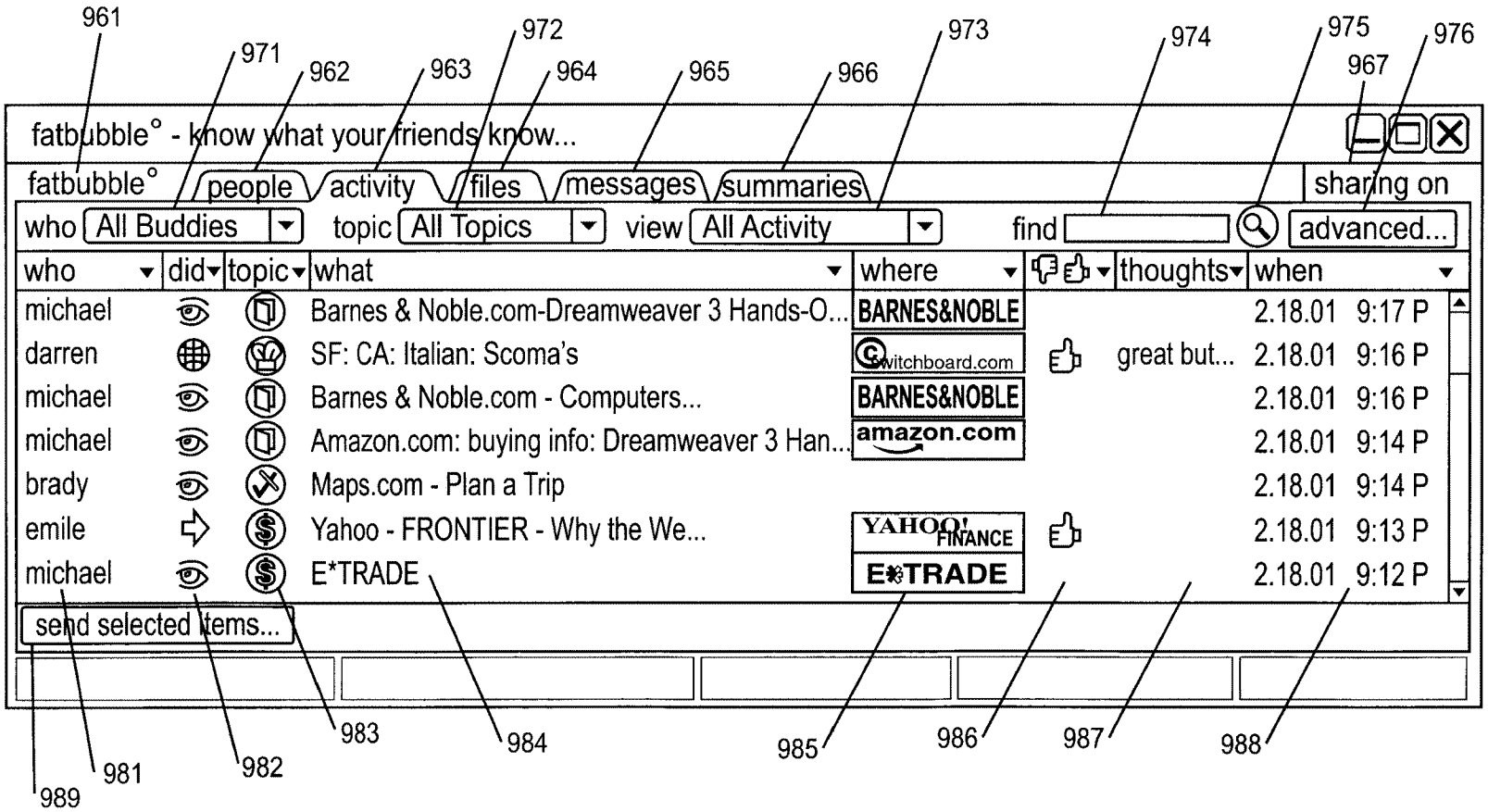
FIG. 9 is a user interface for viewing activity of buddies. The interface illustrated applies as well to viewing of other item or location related data.

FIG. 9 is a user interface for viewing activity of buddies. The interface illustrated applies as well to viewing of other item or location related data. Tab 963 indicates that the activity-viewing mode of the interface is currently active. Other tabs may be provided for people 962, files 964, messages 965 or summaries 966. The people tab 962 may invoke buddy list administration. The files tab 964 may invoke a hierarchical representation of the user's file system and selection boxes for designating directories and files, relative to particular buddies. The buddy may appear as columns adjacent to the file system representation or with a separate list, with selection boxes for users to be associated with particular rights. The message tab 965 may provide access to a message repository. Button 961 provides access to commands such as minimize, maximize, always on top, etc., which were previously discussed in the context of FIG. 3. The sharing button and indicator 967 behaves as previously described, also in the context of FIG. 3. In this embodiment, additional controls are provided in a row below the tabs and sharing button. Three filters 971, 972 and 973 are provided. The who filter 971 specifies whose activity is of interest: for instance, all buddies or a user-defined group of buddies. The topic filter 972 selects one or more pre-defined topics. The view filter 973 allows viewing of all or selected portions of a participant's activity by topic. For instance, only items bookmarked or sent to others may be of interest, in a domain having substantial activity. A keyword search is in effect a fourth filter, including the search term window 974, the find button 975 and the advanced find button 976.

Several rows of information responsive to the filters 971-976 appear in FIG. 9. The columns of information displayed for each row include who 981 did 892 what 984 where 985 in what topic area 982 when 988. Ratings 986 and comments 987 also may be provided. This interface can convey a substantial amount of information compactly. The who column 981 may use short labels, especially when the buddy list is short or subgroups of buddies are created. The did column 982 is compactly represented by an icon, from a recognizably short list of activity types. The icons depicted in this figure may signify viewing, visiting and sending items. Each of the activities mentioned above may be assigned an icon. The topic column 983 also is compactly represented by an icon. The variety of topics may be larger than the variety of activities. User defined subtopics may complicate the selection of icons. In some instances, a user may need to access more detailed information about an activity in order to understand the topic involved. This detailed information may be available through the topics filter 972 or by selecting a particular line including the icon. The what column 984 is an informative title for the item identified. For a URL, a page title may be more informative than the URL. Accordingly, page titles may be stored for URLs, to guard against loss of the page title when a content provider updates the page. Similarly useful shorthands for other types of items may be used. For instance, the name of a restaurant may be used instead of its Bluetooth access point address. The where column 985 is an opportunity to display banners, which may generate user impressions and revenue. Display of banners may be limited to vendors who pay a fee for preferential banner display. The rating column 986 may use a graphic, a color or a symbol to indicate a rating. In this embodiment, icons for thumbs up/down are depicted. The thoughts column 987 may support either free text comments or pick-list comments such as emoticons or user-defined quick comments. The when collum 988 records a date and time of an activity. A send button 989 is included. In this embodiment, it appears as a large button on a bottom row, instead of as an icon near the sharing button. Row select commands, such as mouse-click, shift mouse-click and control mouse-click can be used to select one or more rows prior to selecting the send button.

Figure 10:
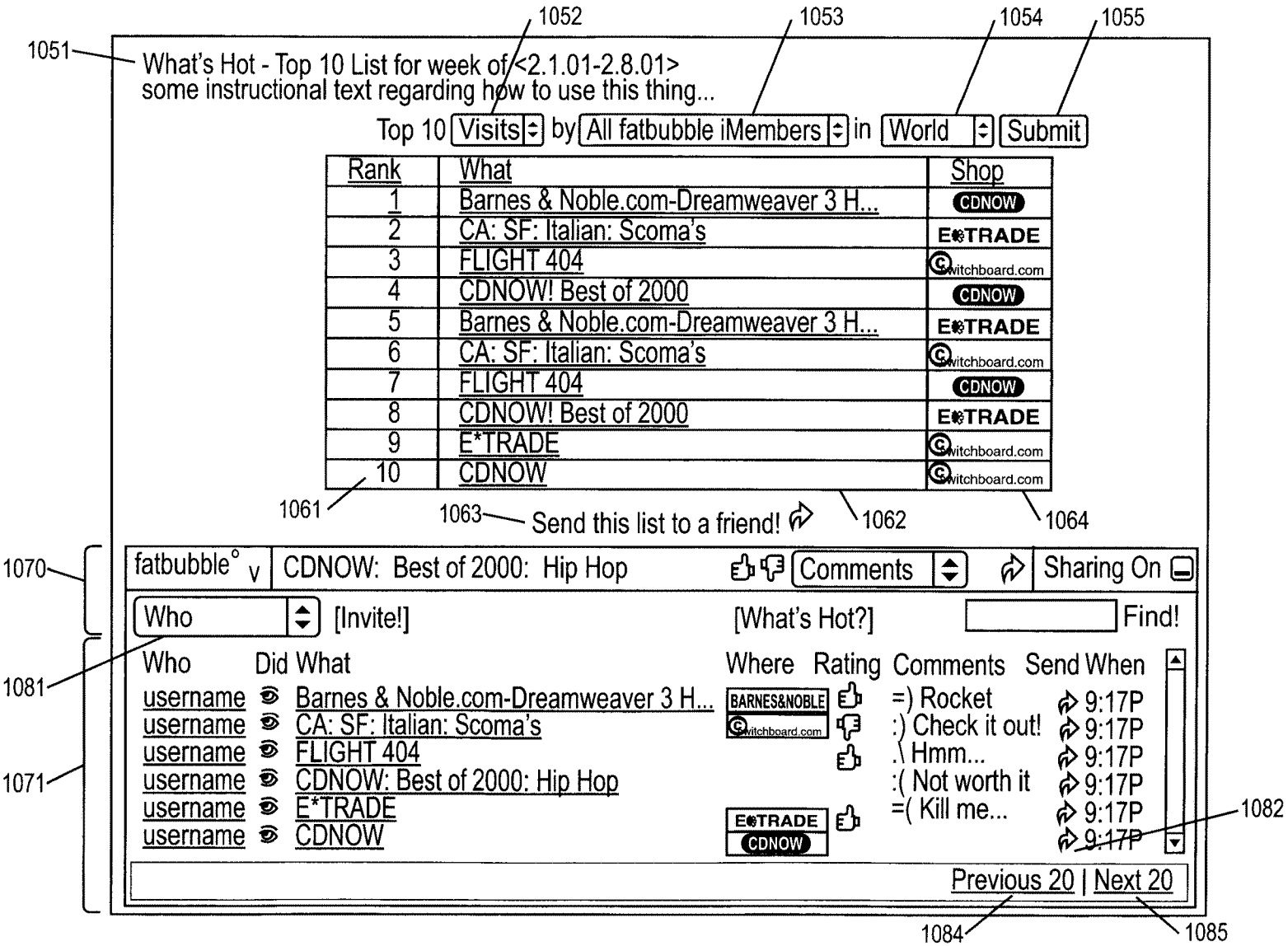
FIG. 10 is a user interface for viewing a so-called hits list, combined with a user interface for viewing activity. The interface illustrated applies as well to viewing of other item or location related data.

FIG. 10 is a user interface for viewing a so-called hits list, combined with a user interface for viewing activity. The interface illustrated applies as well to viewing of other item or location related data. The bottom part of this interface combines features found in FIGS. 3 and 9. Much of the two rows 1070 is taken from FIG. 3. The who filter 1081 is from FIG. 9. The item rows 1071 are generally as in FIG. 9, with an added column for send buttons 1082. Next and previous buttons 1084, 1085 are provided for scrolling through activities.

The top part of the FIG. 10 interface is a hits list. The title line 1051 identifies the category of hits, in this instance a Top 10 list. Filter buttons are provided for activity type 1052, group of persons sampled 1053 and location of persons sampled 1054. When the desired filters are selected, the submit button 1055 signals for the screen to be refreshed. Three columns of information about these 10 hits are provided in this embodiment: rank 1061, what 1062 and where 1063. These columns have been explained above, except the ranking, which is ordinal. The coincidence in this example between data lines in the top 10 list and in the activities is unlikely ever to occur at random in actual use; the repeat of the same lines twice in a top 10 list also is unlikely to occur in actual use.

Figure 11:
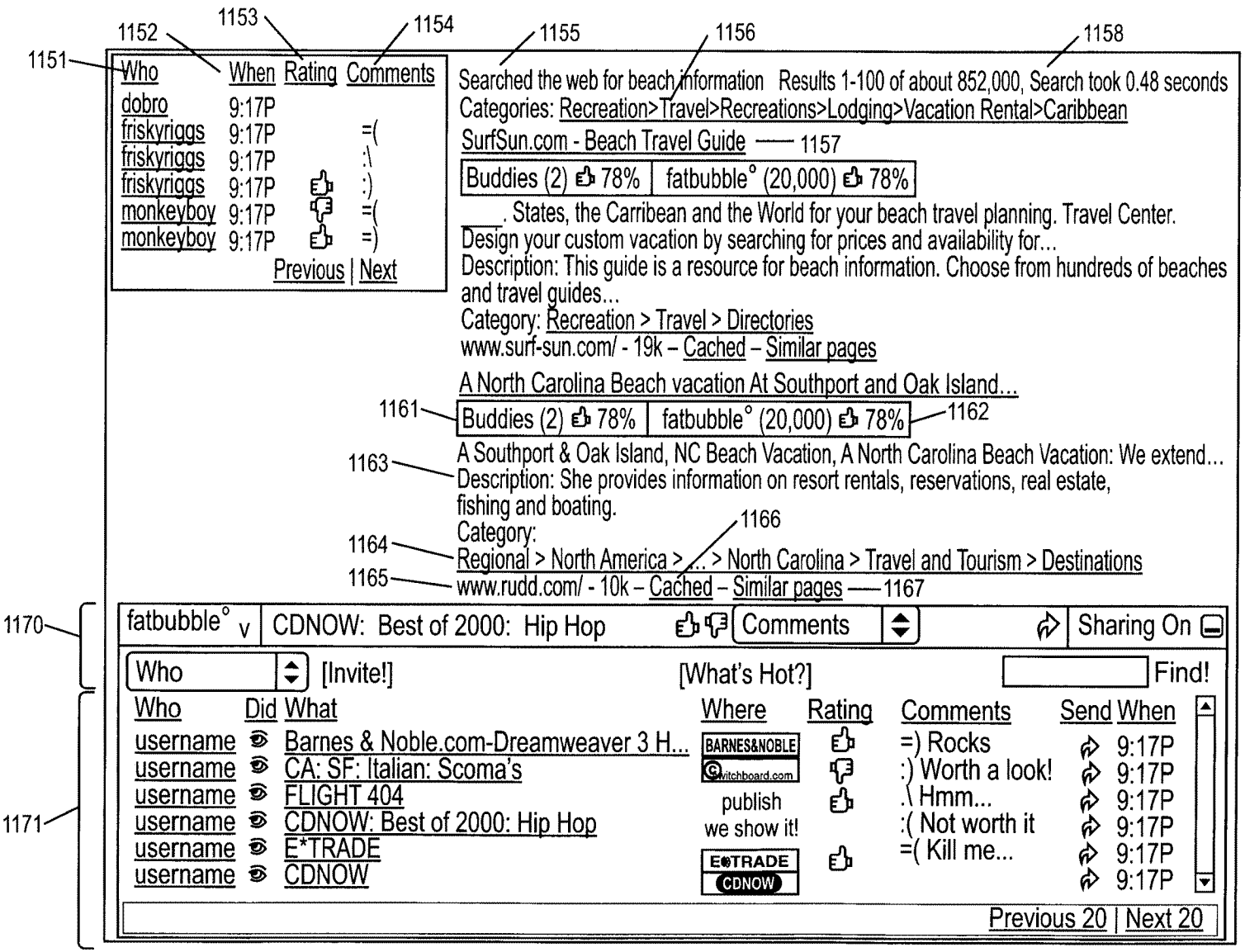
FIG. 11 is a user interface for viewing details regarding particular items. This user interface is combined, like FIG. 10, with a user interface for viewing activity.

FIG. 11 is a user interface for viewing details regarding particular items. This user interface is combined, like FIG. 10, with a user interface for viewing activity. The bottom part of this interface, 1070, 1071, is as in FIG. 10. The top part includes two windows: 1151 through 1154 and 1155 through 1167. The larger frame in the top part displays search results, annotated with buddy-related information. The search string appears at the top 1155 along with summary search statistics 1158. Both category results 1156 and individual items have been returned in this example. One category 1156 has been returned. Three items responsive to the search have been returned, each beginning with a title 1157. Information for an item may include a buddies rating 1161. The number of buddies of the user who have commented on the site is indicated parenthetically. A summary "thumbs up" is indicated and a percentage of favorable ratings appear. (In actual use, 78% would not be reported from a sample of three ratings.) In addition to user-buddy ratings, other group ratings can be reported. In this instance, ratings aggregated against all registered users 1162 are reported. The second group could be user selected. In an enterprise implementation, it could be a division, subsidiary, a whole enterprise or any other predefined group. The ratings 1161, 1162 need not be up-to-the-moment ratings, they may be compiled periodically in a batch mode. The information for an item may include a site furnished text 1163, a review furnished description 1164, one or more categories applicable to the item 1165 and links for retrieving a cached copy 1166 or similar pages 1167. The cached copy retrieval 1166 may be an alternative to retrieving a live copy of the item 1157, which is useful when an item is deleted or moved after it is indexed.

The inset to FIG. 11, 1151-54, is intended to provide detailed information related one or more of the items displayed. The columns of detailed information in this embodiment include who 1151, when 1152, rating 1153, and comments or emoticons 1154. If there are more users then can readily be displayed in a single inset, previous and next buttons can be used to scroll through a list. Alternatively, the list can be sized into a larger window. The list also could be filtered to select particular buddies or groups of buddies, date ranges, ratings or comments. The names of individual users and their comments can be linked to additional information or functions related to the individual and to the detailed free text comments.

Figure 12A:
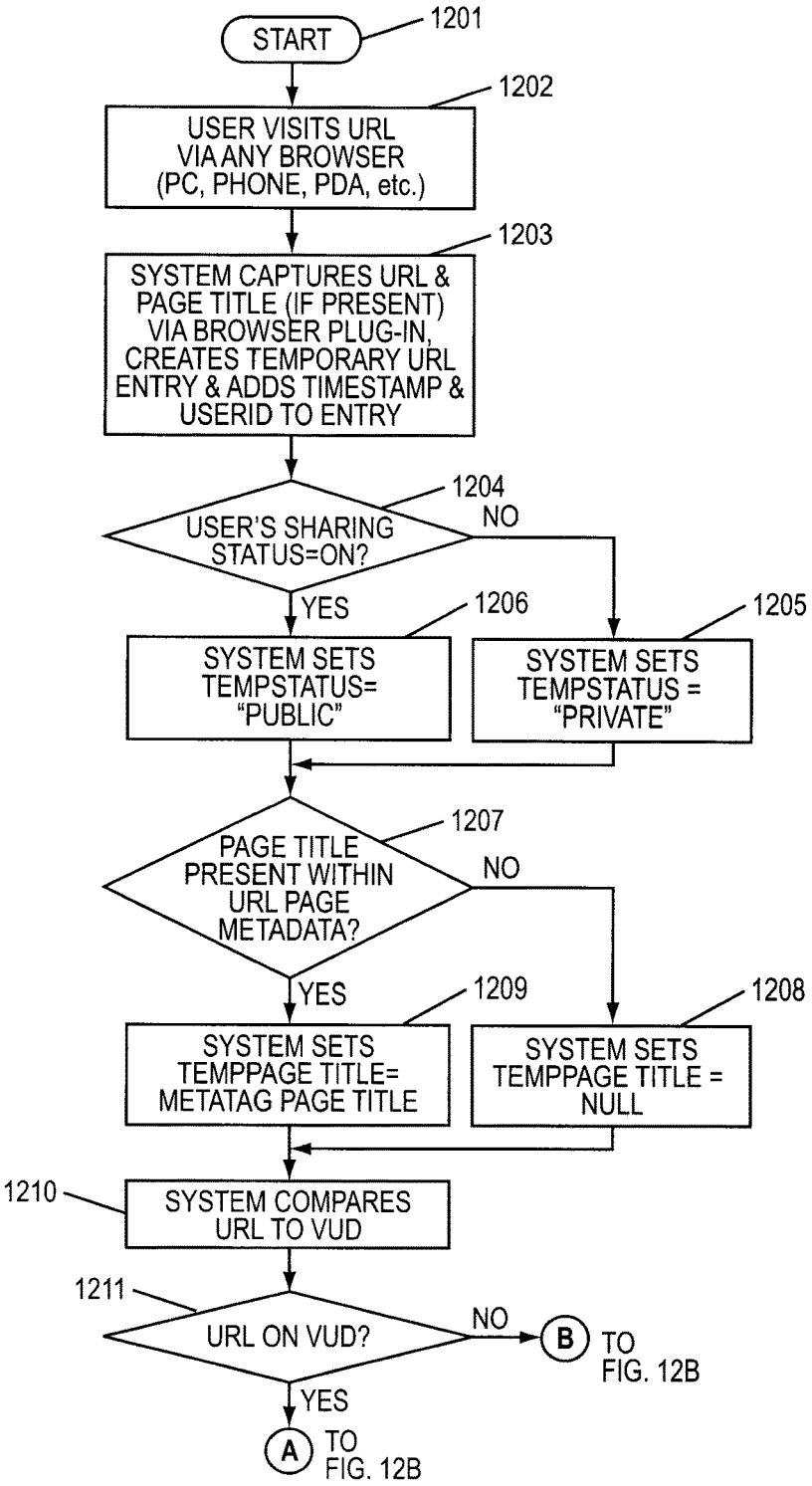
Figure 12B:
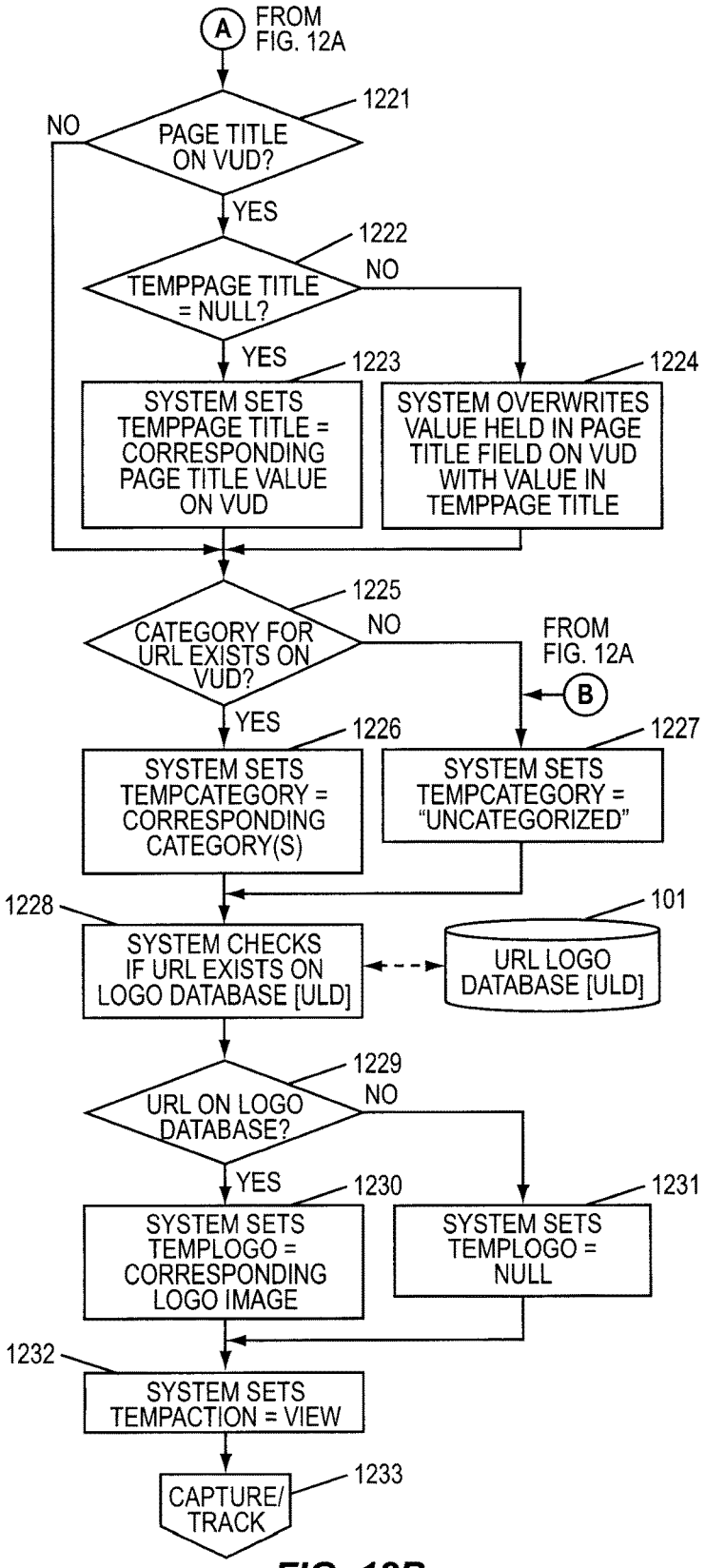
Figure 13:
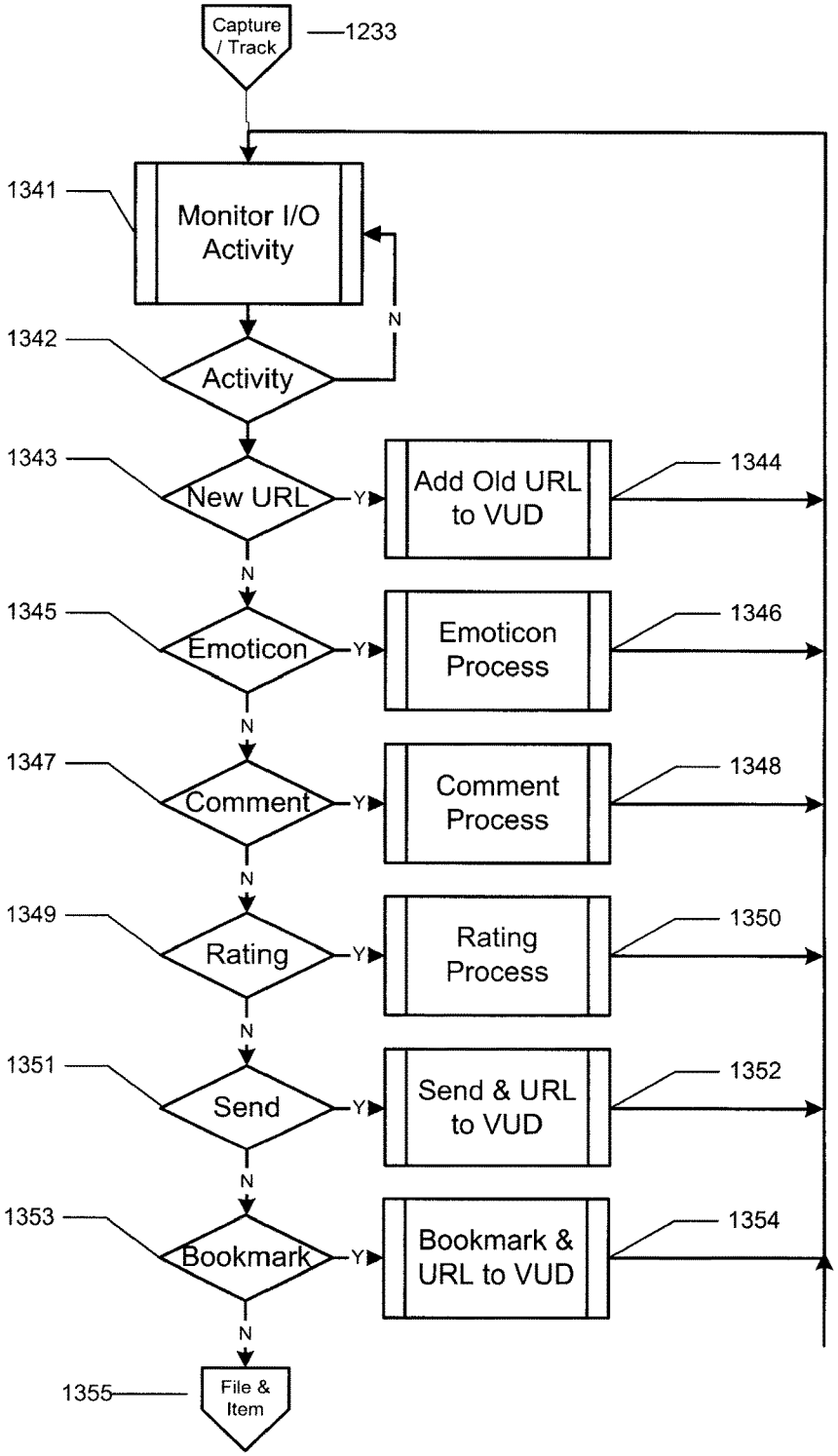
Figure 14:
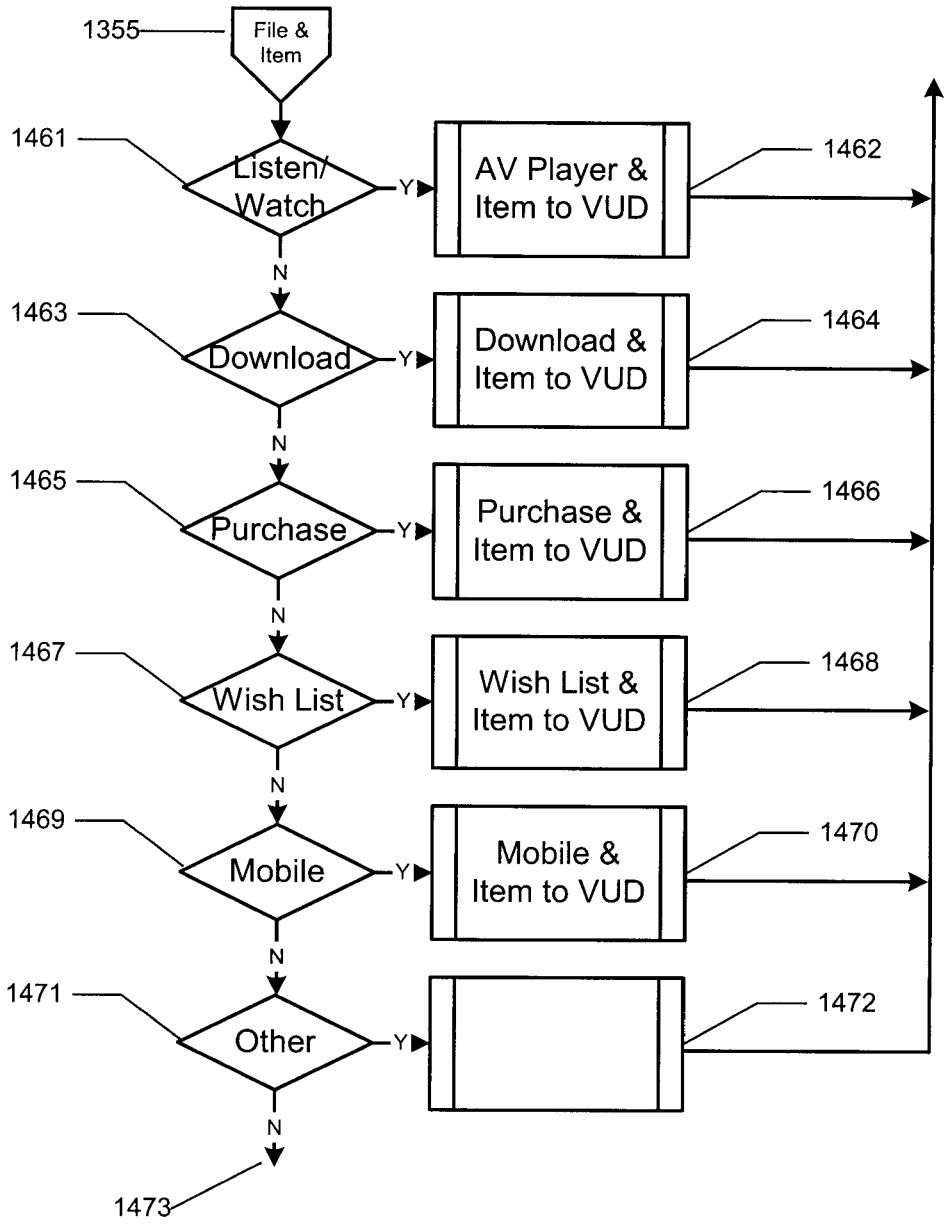

FIGS. 12-14 are a flowchart illustrating the capture of URL related data from a user. The actions illustrated by this flowchart apply as well to capture of other item or location related data. FIGS. 12 and 13 are linked by the capture/track connector 1233. FIGS. 13 and 14 are linked by the file & item connector 1355. The flow in FIG. 12 begins with start 1201. The user may visit a URL 1202 utilizing any browser, from a PC, telephone, PDA or other device. Others processes described in the context of visiting or viewing a URL, it may be applied to other item types as well. The URL visited is captured 1203. This capture may be accomplished via a browser plug-in, an independently running process, or in a variety of other ways. A page title or other descriptive text may be captured in addition to the URL address. The page title or other text is stored in a temporary variable, along with a timestamp and a user ID. In this embodiment, the capture process next has to determine whether in the user's sharing status is on 1204. If the sharing status is off 1205, the system sets the status of the item to private. In other embodiments, the system might all processing of the item. If the sharing status is on 1206, the system sets the status of the item to public. After the status is been sent, the process tests to determine whether metadata associated with the URL provides a page title 1207. If not 1208, the system stores a null indicator in a temporary variable.

If the metadata provides a page title 1209, the system stores the page title in a temporary variable. The system next compares the URL to entries in the VUD 1210. If the URL is found in VUD 1211, the system has to determine whether a page title is stored on the VUD 1221. If there is a page title on the VUD 1222, the system action depends on whether the page title variable has been set to null. If not, the system over writes the value on the VUD with the value of the temporary page title variable 1224. If the temporary page title variable is null, the page title stored on the VUD is used 1223. Next, the system determines whether the URL has been categorized on the VUD 1225. If not, the system sets a temporary category variable to uncategorized 1227. This is the same action that the system takes in the URL is not on the VUD 1211. If the URL has been categorized on the VUD, the system sets a temporary category variable based on the contents of the VUD 1226. The system checks to determine if the URL or a portion of the URL is logged in a logo database 1228. The logo or ULD database 101 holds vendor logo images that correspond to the vendor's URLs. If the vendor has not arranged for its logo to be stored on the VLD 1229, the system sets the temporary local variable to null 1231. If there is a corresponding logo, the temporary variable is set to the corresponding logo image 1230. The system sets a temporary activity variable to view 1232, corresponding to viewing a URL. The flow continues in FIG. 13.

FIG. 13 depicts processing of URLs behind the interfaces presented above. The user has several options after viewing a URL. Viewing the URL triggers background activities depicted in FIG. 12. While the user is viewing the URL, system monitors for activity 1341. If no activity is detected 1342, monitoring continues. When activity is detected, the system determines the type of activity 1343, 1345, 1347, 1349, 1351, 1353. When the user moves to a new URL 1343, the values stored in temporary variables for the old URL are added to the VUD 1344. The new URL is processed in accordance with FIG. 12. When the user selects an emoticon 1345, the system processes the user's selection 1346. The system may associate either a predefined emoticon with the URL or it may associate a user-defined emoticon with the URL. These values may be stored in a temporary variable until the user moves to a new URL or another user activity triggers storing data to the VUD. When the user decides to enter a free text comment 1347, the system processes the free text 1348. It associates a text string with the URL at a temporary location, which can later be transferred to the VUD. The system then resumes monitoring for URL activity 1341. The user selection of rating 1349 is processed 1350 in much the same way as an emoticon. In the embodiment described here, the rating is either thumbs up for thumbs down, a binary rating. Multi-value ratings can also be processed, such as a scale of 1 to 5, 1 to 7, or 1 to 9. The system then resumes monitoring for URL activity 1341. Choosing the send button 1351 causes two processing steps 1352. One or more items in the current context are sent to a buddy and the activity of sending the items is reported to a tracking server to be recorded in the VUD. The system then resumes monitoring for URL activity 1341. Processing that follows detection of a bookmark activity 1353 is similar to processing of a send activity. Either the instant messaging product or the system may process the actual creation of the bookmark. The activity of creating the bookmark is reported to a tracking server to be recorded in the VUD 1354. Again, the system then resumes monitoring for I/O activity 1341. Other activities, more often associated with an item other than a URL, are processed as depicted in FIG. 14.

A variety of activities may be associated with items other than URLs. Depending on the type of item involved, the user may listen to or watch the item 1461, download the item 1463, purchase the item 1465, put the item on a wish list 1467, transfer the item to a mobile device, such as a cell phone or PDA 1469, or select some other process 1471. In some circumstances, an unrecognized activity may occur 1473, which the system may either ignore or treat is an error condition. A listen to or watch activity 1461 causes the system to invoke a player and to record the action and properties of the item listened to or watched 1462. The recorded information is forwarded for addition to the VUD. A download activity invokes a process, which records the download action and properties of the item downloaded 1464. The recorded information is forwarded for addition to the VUD. A purchase activity 1465 invokes a process 1466, which records the purchase action and properties of the item purchased. The recorded information is forwarded for addition to the VUD. A wish list activity 1467 invokes a wish list process 1468 to maintain and add to the user's wish list. The wish list can be maintained as part of the VUD or in a separate database. The information can be maintained redundantly as part of the VUD and as the result of a batch query. When the activity is to transfer the item to a mobile device 1469, the system invokes a process for sending the information to the mobile device, records the action and properties of the items sent to the mobile device, and forwards the recorded information for addition to the VUD 1470. The processing of each of these activities in FIG. 14, with the possible exception of error processing 1473, leads back to monitoring for activity 1341.

FIG. 15 is a flowchart of automated updating of a visited URL database or VUD, with exception processing. The actions illustrated by these flowcharts apply as well to updating of databases reflecting captures of other item or location related data. An automated VUD updating routine 1511 updates keywords and metadata 1512 and topics 1513. The input for updating is a set of VUD update records from processing of user activity. Updating 1514 may take place and real-time or on a batch basis. The updating of keywords and metadata utilizes a URL spider and an external search engine index to gather URL indices, keywords and metadata for each VUD entry being updated from the Internet 1522. Unmatched entries are stored in an exceptions database 1505 and an exception report 1521 is generated. Data in the exceptions database ("UMED") may be manually added to the VUD. These exceptions also can be reprocessed for instance, if Internet access is restored or improved. Additional processing takes place to update topics associated with VUD entries 1513. During processing 1515, the system compares VUD entries against one or more external URL categorization databases, such as the database provided by the Open Source Directory Project (www.dmoz.org). Matches are processed for addition to the VUD. VUD entries that do not match are marked as on categorized and stored in an exceptions database 1507. Data in this topic exceptions database ("TMED") may be added manually to the VUD or reprocessed any time. Additional items to the exceptions database may cause an exceptions report 1523 to be generated.

FIG. 16 is a flow chart of an activity viewer. The actions illustrated by this flowchart apply as well to viewing of URL, other item or location related data. The activity display population routine 1621 supports the interface 1629, which previously has been discussed in the context of FIG. 9. The system keys 1622 on fields which provide access to the relevant database, such as the VUD, VLD 100 or VXD. For VUD entries, user ID and topic may be used as a key. Alternatively, the key may be fields which match filters available to or selected by the user. For a visited location, user ID and location or action may be used as a key. The system 1622 matches data from the relevant database 100 with the user ACL database 1609. This matching may run periodically on a schedule set by the system administrator or it may run on demand. Data "matches" when the ACL database authorizes the requester or a particular user to have access (e.g., by user ID and topic) to the VXD entry and the status flag is public (as opposed to private) for the VXD entry. Matched data items are buffered 1623. For each buffered entry 1624, the system checks for the existence of a logo on the location logo database ("LLD") 1608. Processing depends on whether or not a logo exists 1625. If it exists, the system sets a temporary variable corresponding to the logo image retrieved from the database 1626. Otherwise, the logo space is left blank. Each matched entry is added 1627 to the corresponding shared users file within the activity viewer database ("AVD") 1610. The system populates activity viewers of logged-in users by pulling entries from the AVD 1628. User ID, action, item, location, category, rating, emoticon, comment, time, or other relevant field may filter the displayed data from the AVD. The activity viewer of the user refreshes the activity display automatically. The frequency for this refresh may be set by a system administrator and may be modified by the user.

FIGS. 17-19 are flow charts of buddy list and access control list ("ACL") administration. The after the administration processes invoked 1721, the process tests to determine whether the user of the system is a new user 1722. A new user may either be invited or not 1725. An invited user is prompted to a start their buddy list with the person who and issued the invitation 1731. If the new user adds the person who invited them 1732, the new user optionally defines access rights 1735. The system then sets flags for new and invited status to "no" 1736. The system adds the buddy and associated information in the user's buddy list to the ACL 1734 and loops back to the start 1721 with the user flagged as not new. In the processing of the new user, if the new user is not invited 1725 or declines to add the person who invited them to the new user's buddy list 1732, an error message is displayed indicating that at least one buddy must appear on a buddy list 1726. The user is routed to an add buddy screen 1733. This add buddy screen 1733 also may be reached by a non-new user who has an empty buddy list 1723 through the invite buddy error message 1726 or after the non-new user is shown their current buddy list 1724 and elects 1727 to add additional buddies. Processing of a non-new user who declines to add additional buddies proceeds to 1728, in FIG. 18. After the add buddy screen, the system checks the user's IM tool flags to determine which instant messaging tools are available and to provide an adapted message to the user 1734. The user's options 1738 may include asking for more information, canceling the addition of users or selecting an instant messaging tool such as AIM user, ICQ user, Odigo user or Yahoo IM user. The user may be required to confirm my pressing an OK button after selection of an instant messaging tool. If the user presses OK 1741, instead of cancel, the system tests to determine whether the user requests more information 1742 and provides an information screen 1745 upon request. The system also tests to determine whether the user requests shared topics information 1743 and provides an information screen 1746 on request. After information has been provided the system tests determine whether the user has selected one of the instant messaging options 1744. If not, the system loops and waits 1741. If an instant messaging tool has been selected, the system determines which class of instant messaging tool has been selected 1752. For some instant messaging tools, the system displays a name field 1754 and prompts the user to enter a name 1756. For other instant messaging tools 1751, the system displays a user number field and prompts the user to enter a buddy number 1753. For both classes of instant messaging tools 1755, the user optionally defines access rights. Processing then continues to test for inviting a new buddy 1757, as described in FIG. 19.

FIG. 18 includes logic for editing entries in the buddy list, following other processing 1728. The system checks to determine whether one or more buddies have been selected 1861. If not, processing 1862 returns to a previous screen. If a buddy has been selected, processing depends on the number of buddies in the list 1863. If there are one or fewer buddies in the last 1864, the system activates only the end button. If there is more than one buddy in the list 1866, the system activates edit and remove buttons. The remove button is not activated for one or fewer buddies, as the system requires at least one buddy in a buddy list. The system checks to determine whether edit has been selected 1867. If not, it checks to determine whether remove has been selected 1868. If not, processing returns to the start 1865. If remove has been selected 1869, the system displays a confirmation screen and tests whether the remove command has been confirmed 1872. If not, the system loops again to test whether remove has been selected 1868. If confirmation is given 1874, the system removes one or more buddies from the user's buddy list and returns to the start 1865. Remove will not have been selected if edit is selected 1871. The system responds to selection of edit with an edit user screen 1871. The user responds to the screen by editing any the fields of the selected buddy and clicking submit or cancel. The system tests to determine whether submit has been selected 1875 and, if so, tests to determine whether mandatory fields have been completed 1877. Mandatory fields may include the identity of the instant messaging tool and a user ID, either a name or user number, as appropriate. If some of the mandatory fields are incomplete, an error screen 1876 is displayed and the user is given a further opportunity to add any of the fields 1873. If the mandatory fields are completed, the system updates the buddy and associated information in the buddy list 1878 and returns to the start 1865. If the user clicks cancel instead of submit or otherwise fails to submit 1875, processing proceeds to test whether remove has been selected 1868. The processing from this point proceeds as described above.

FIG. 19 depicts logic for sending invitations to new prospective buddies. This logic complements other interface processing 1757. The system determines whether the user has selected the send invitation link 1982. If not, processing returns to the start 1981. If so, the system checks to determine whether the user being invited is already registered for services 1984. The system uses the prospective buddy's IM tool ID as a key. if the prospective buddy has more than one IM tool, the system may either use only a primary IM tool ID or may use all listed IM tool ID's to check for current registration status. If the prospective buddy is not registered 1985, the system invites the buddy by invoking the user's instant messaging tool and creating a message with standard text and a link to invoke a registration process 1983. The system queues the invited prospective buddy in a file of pending invitations 1986. The invited buddy's ACL and instant messaging ID will be stored against a temporary registration ID. When the invited buddy responds to the invitation, the system will use the temporary ID to match the invitee against the queue. After an invitation has been made, the system marks the user's buddy list as not empty 1989 and sets the user's new and invited flags to "no". For a the prospective buddy 1985 who is already registered, the system notifies the user of the prospective buddy's status 1987 and stores the buddy name with relevant information, such adds an identification of the instant messaging tool used by the buddy 1988. The system adds the buddy and associated information to the user's buddy list 1990. The system allows the user to send messages to the buddy, including a message regarding their ACL status 1991. Either the user's instant messaging tool with standard text and links or an e-mail message may be used for this purpose. The system sets the user's new and invited flags to "no" 1992 and returns to start 1981.

FIGS. 20-21 are a flowchart for access control list administration. In FIG. 20, ACL administration begins with a start screen 2051. One sensible default organization is by topic 2052. In the "by topic" view, the system checks 2053 to determine whether a "by buddy" view has been selected. If so, logic for displaying and processing the "by buddy" view is invoked 2054. If not, the system checks to determine whether the administration session has been canceled 2055. If "cancel" has been selected, the system determines whether the page has been marked as amended 2056. If the page has not been amended, the system returns to a previous screen 2050. If it has been marked as amended, the system prompts the user to save changes 2057 and tests whether the user wants to save changes. If not, the system simply the reverts to a previous screen 2050. If so, the system updates various access flags and related data 2066 before reverting to the previous screen 2050. When "cancel" has not been selected, the system checks whether a topic folder has been selected 2059. If so, the system shows the corresponding buddy list access level in a pane of the view screen 2060. The system then determines whether tick boxes adjacent to any buddy name have been checked 2061. If so, the display format of the buddy name may be altered to reinforce the tick mark and the page is marked as amended 2062. Processing continues to determine whether a buddy name has been de-selected 2063. If so, the display format of the buddy name may be altered to reinforce to the de-selection and page is marked as amended 2064. Processing continues to determine whether "submit" has been selected 2065. If not, processing loops to before 2053. If so, the update path 2066 is followed.

In FIG. 21, ACL administration proceeds from selection of the "by buddy" view 2054. This view is displayed 2172. The system determines whether the user has selected a change of view to "by topic", for instance. If so, the display is changed 2171. If not, the system determines whether the user has selected "cancel" 2175. If "cancel" has been selected, the system determines whether the page has been marked as amended 2176. If the page has not been amended, the system returns to a previous screen 2174. If it has been marked as amended, the system prompts the user to save changes 2177 and tests whether the user wants to save changes 2178. If not, the system simply the reverts to a previous screen 2174. If so, the system updates various access flags and related data 2186 before reverting to the previous screen 2174. When "cancel" has not been selected, the system checks whether a buddy folder has been selected 2179. If so, the system shows the corresponding topic list access level in a pane of the view screen 2180. The system then determines whether tick boxes adjacent to any topic name have been checked 2181. If so, the display format of the topic name may be altered to reinforce the tick mark, and the page is marked as amended 2182. Processing continues to determine whether a topic name has been de-selected 2183. If so, the display format of the topic name may be altered to reinforce the de-selection and the page is marked as amended 2184. Processing continues to determine whether "submit" has been selected 2185. If not, processing loops to before 2173. If so, the update path 2186 is followed.

FIG. 22 is a flow chart of the batch and custom query processes. Batch processing of requests 2251 may be useful to reduce response time for certain processing-intensive queries. For instance, scoring the top 10 or top 100 hits in a category may require a substantial amount of processing which the user would be unlikely to endure. The selection of a hit list may be from a menu, which means that the number of processing-intensive queries is limited and manageable. The system performs predefined queries 2252 against the VUD 100A and the VLD 100B or any similar database on a batch basis. The results are sent to a database of batch query results ("BQD") 2211. These predefined queries are accessible immediately to both Internet and wireless network queries. FIG. 22 distinguishes between Internet queries 2253 and wireless queries 2255. Internet queries may include both predefined queries and custom-built queries 2254. To the extent that wireless queries are hampered by limited bandwidth, wireless queries may be limited to predefined queries 2256. The processing of both types of queries is essentially the same 2257. The user submits a query to the system and the system either performs or real-time query 2258 or retrieves a predefined query from the batch query database 2259. The system returns results of the query to the user 2260.

FIG. 23 extends aspects of the present invention to wireless devices, such as cellular telephones and pagers. Processing of wireless location and action data begins at 2351. The user's wireless communication device and location detection service is first activated 2352. It is necessary for the user to have a wireless device 2354, which supports a location detection service. This support may be by Bluetooth, GPS or any other location detection technology. Then, the link between location detection and activity sharing is activated 2353. A login process may be automated to execute whenever the wireless device 2354 is activated. Given the activation of a wireless device, the system periodically receives information regarding the location of the wireless device 2356. As described above, this may be on an interrupt, polling or periodic batch transfer basis. A location network directory 2312 is accessible, which reflects location of wireless devices 2354 and contains information such as the devices' location address, location description, a timestamp, and user ID 2358. With this information, the system sets the action or activity type to "visit" a location and logs an entry into a visited location database 2358. The system also monitors 2355 for activity related to a location, such as bookmarking a location, rating a location, adding an emoticon or comments about the location. Activity monitoring 2355 continues when no input/output activity is detected 2357. When input/output activity is detected, the system determines the type of activity. Typical activities include bookmarking 2359, rating, or adding an emoticon 2363 or free text comment to a location reference. When a location is bookmarked 2359, the system adds a bookmark flag, location address, location description, a timestamp and a user ID to the VLD or a buffer for later addition to the VLD. When a location is rated 2361, the system adds the rating, location address, location description, a timestamp and the user ID to the VLD or a buffer for later addition to the VLD. When a location is flagged with an emoticon 2363, the system adds the emoticon, location address, location description, a timestamp and the user ID to the VLD or to a buffer for later addition to the VLD. Similarly, when a user makes a comment on a location 2365, the system adds the comment, location address, location description, a timestamp and the user ID to the VLD or to a buffer for later addition to the VLD. For each of these activities, fewer or more fields may be utilized in various embodiments.

FIG. 24 is a flow chart of populating the visited location database ("VLD"). The process for updating topics and descriptions begins at 2451. The system compares 2452 all VLD entries or buffer entries for addition to the VLD against location category and location description database entries 2413. It updates the matching entries and records to categorization and descriptions to the VLD. Unmatched entries are recorded in an exceptions database 2414. This location-topic and location-description match exceptions database ("LTMED") may be used to generate an exceptions report 2453. Matched entries are written to the VLD 100B.

APPLICATION EXAMPLES

The interfaces and software described above support many methods and devices for sharing communication device and computer usage experiences. One type of sharing communication device user experiences is sharing computer usage experiences, including Internet browsing experiences. Whichever communication device is used, sharing may depend on registration by a user with a registration server. Registration may involve downloading client software to run on the user's system. For enterprise applications, registration may be handled by a system administrator and integrated or coordinated with registration for network login, e-mail or other messaging. In some embodiments, registration may include contractual terms which limit the use of information collected from the user. In other embodiments, registration may be designed to exclude collection of certain user information, such as the user's e-mail address, actual name or physical address. Some users may feel more comfortable registering with the system if registration excludes collection of any information that identifies the user in a manner adapted to direct marketing. Even if registration excludes initial collection of user identifying information, the user may be given the option of entering additional personal information for general use by the providers of the system or for restricted use, in accordance with contractual terms. The registration process may make the user aware that at least a portion of the user's experiences with a communication device, computer or Internet browser will be collected and shared. It also may make the user aware that information collected from the user will be aggregated with information collected from other users.

Sharing communication device experiences also may include accessing one or more messaging buddy lists associated with the user. Accessing pre-existing buddy lists provides a base for linking the user and buddies with whom tracking data may be shared. Buddy lists may be maintained by AOL's Instant Messenger software, MSN's Messenger software, Yahoo! Messenger software, America Online's ICQ software, Indigo's instant messenger software or Jabber's instant messenger software. More generally, message recipient lists maintained in e-mail systems, such as Microsoft's Outlook products or AOL's Netscape products may maintain the lists that are accessed. Messaging systems such as Lotus Notes also may maintain message recipient lists that the system can access to identify persons with whom tracking data may be shared.

Buddies or groups of buddies are given defined rights to access tracking data collected from the user. Defined rights of buddies to access tracking data may be based on content categories of material accessed. Examples of content categories or topics can be found in FIG. 8D. Defined rights of buddies also could be based on keywords. Definition of rights to access tracking data collected from the user may have multiple aspects. Access may be restricted by the type of activity involved, such as viewing, listening, rating, commenting, assigning an emoticon, sending, watching, downloading, bookmarking or visiting. Access may be further restricted by when the activity potentially accessed took place. It may be restricted based on a value assigned to a rating or emoticon. It can also be restricted based on its original source. Activities marked private, instead of public, may never be shared, based on a user's decision to turn sharing off. There are many useful combinations of these approaches to define the rights of buddies or groups of buddies to access tracking data.

At least a portion of the user's computer usage experiences are tracked and reported to a tracking server. This tracking may be carried out by a module resident on the user's computer or by a device placed between the user's computer and an access point to the Internet. In an enterprise implementation, tracking can be carried out by a server or proxy server. The tracking data can be filtered before it is reported to the tracking server. Data may be filtered based on a sharing on/off option exercised by the user. It also may be filtered based on content categories. In some implementations, only those activities that fit content categories which the user agreed to share would be reported to the tracking server. Alternatively, activity could be reported to the tracking server that was never intended to be posted for access by buddies. The tracking server or a posting server could filter the information before posting it for buddies to access. The computer user experiences tracked could include viewing URLs, downloading files, listening to songs, viewing videos, making purchases, sending items from a user to their buddies, or general messaging between the user and buddies.

In addition to computer user experiences, mobile communication device locations can be tracked, using any of the technologies described above. Activities related to location may include visiting the location, rating, commenting on it, assigning an emoticon, or connecting with another buddy or buddy of a buddy at the location. Proximity to a location may be variation on visiting the location.

It further may be useful to categorize at least a portion of the tracking data by content. The categorized tracking data would be subject to filtering and sorting. Categorized tracking data also could be searchable by content category and date range. For instance, a particular buddy's viewing of stock-related sites containing the name "Cisco" during a one or two-month period could be located.

Tracking data can be posted, after filtering, for buddies to access according to their defined access rights. The interface for viewing activity reflected by the tracking data may include a send button, which allows a user to forward an item to a buddy, either with or without comment. Interface also may include rating an emoticon buttons. It may facilitate free text comments on an item. These functions may apply to selected groups of items, in addition to applying to individual items. The buttons for free text comments and the feature for adding notes to items sent to buddies allow annotation of items.

The tracking process further may include generating a full text index of items viewed. This indexing may be performed in the context to viewing URLs or, in an enterprise implementation, in the context of the viewing internal work product or summaries of internal work product. Automated some regeneration may be combined with indexing, so that summaries are indexed.

Additional functionality of the system, which passively tracks activities of registered users may include tracing the flow of information or data among registered users. Information which is sent from a user to a buddy may be annotated with a history of users who forwarded the information. Alternatively, it may include a first user who forward the information and the immediately previous forwarding user. Or, it could identify a limited number of previous forwarding users. If less than a will history of users who forwarded the information is included with information sent from a user to a buddy, an analysis server may use a combination of timestamps and forwarding information to determine the dissemination or diffusion information and the velocity at which it is disseminated. Social network theory provides a number of metrics for evaluating the dissemination or diffusion of information. The tracking capabilities which are an aspect of the present invention can readily be adapted to quantifying the relative influence of one or another user on their buddies, including the strength, frequency, extent and relative value of their influence. Certain users may be selected for introduction to information or new product releases. Certain users may be selected and rewarded as a result of efficient dissemination of information through their social network.

A system practicing aspects of the present invention can readily collect, collate and present user generated lists of superlatives regarding activities, products and services. List may be generated by time period, utilizing date stamps and activities, number of top items (10 or 50 or 100 top items) or other filtering criteria.

The availability of location information for mobile communication devices allows the system practicing aspects of the present invention to present information regarding buddies and buddies of buddies who may be present at the user's physical location. Based on tracking visits to locations, information can be generated such as a particular user's list of favorite restaurants or favorite boutiques. Patterns of visits to physical locations can be reported. Information can be presented to users based on locations recently visited.

Information associated with particular locations can be offered up to users of mobile communication devices, in a context sensitive mode. Categories of information such as buddies' ratings of nearby restaurants can be provided, utilizing location information generated from the mobile communication device and established buddy lists.

While the preceding example applications are cast in terms of a method, devices and systems employing this method are easily understood. A magnetic memory containing a program capable of practicing the claimed method is one such device. A computer system having memory loaded with a program practicing the claimed method is another such device. A system including a registration server and a tracking server practicing the methods described above is another such device.

While the present invention is disclosed by reference to the embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim:

[1. A method of sharing computer user experiences, including:

communicating with a registration server to register a user, for automatic client-side collection of computer usage experiences for future sharing, wherein the computer usage experiences include one or more of browsing URLs or visiting a location with a location-aware device that records the visited location;

accessing one or more of the user's messaging buddy lists and selecting one or more buddies with whom to share the automatically collected computer usage experiences;

defining categories of computer usage experiences to be shared with particular selected buddies;

tracking automatically on the client-side at least a portion of the user's computer usage experiences and reporting the user's computer usage experiences to a tracking server to be published to the particular buddies in accordance with their defined categories of sharing.]

[2. The method of claim 1, wherein the registration server and the tracking server are a single server.]

[3. The method of claim 1, wherein the registration server and the tracking server are distinct servers.]

[4. The method of claim 1, wherein registering the user excludes collection of the user's e-mail address.]

[5. The method of claim 1, wherein registering the user excludes collection of the user's actual name.]

[6. The method of claim 1, wherein registering the user excludes collection of the user's physical address.]

[7. The method of claim 1, wherein registering the user excludes collection of any information that identities a user in a manner adapted to direct marketing.]

[8. The method of claim 1, wherein registering the user further includes establishing an anonymous unique identifier for the user.]

[9. The method of claim 8, wherein reporting the tracking data includes reporting the anonymous unique identifier.]

[10. The method of claim 1, wherein the messaging buddy list is maintained by AOL's Instant Messenger software.]

[11. The method of claim 1, wherein the messaging buddy list is maintained by MSN Messenger software.]

[12. The method of claim 1, wherein the messaging buddy list is maintained by Yahoo! Messenger software.]

[13. The method of claim 1, wherein the messaging buddy list is maintained by America Online's ICQ software.]

[14. The method of claim 1, wherein the messaging buddy list is maintained by Odigo's instant messenger software.]

[15. The method of claim 1, wherein the messaging buddy list is maintained by Jabber's instant messenger software.]

[16. The method of claim 1, wherein the rights of the buddies are defined by content category of the user's computer usage.]

[17. The method of claim 1, wherein the rights of the buddies are defined by appearance of one or more keywords on pages corresponding to URLs viewed.]

[18. The method of claim 1, wherein the rights of the buddies are defined by activity type of the user's computer usage.]

[19. The method of claim 1, wherein the user utilizes a computer and tracking is carried out by a module resident on the computer.]

[20. The method of claim 1, wherein the tracking is carried out by a device placed between a computer utilized by the user and an access point to the Internet.]

[21. The method of claim 1, wherein the computer usage experience tracked is filtered before it is reported to the tracking server.]

[22. The method of claim 1, wherein the computer usage reported is filtered after it is reported to the tracking server and before it is posted for the buddies to access.]

[23. The method of claim 1, wherein the messaging buddy list is maintained by an instant messenger software.]

[24. The method of claim 1, further including sending tracking data regarding one of a user's computer usage experiences to one or more buddies.]

[25. The method of claim 1, further including categorizing at least a portion of the tracking data by content and sorting the tracking data by content category.]

[26. The method of claim 1, further including categorizing at least a portion of the tracking data by content and making the tracking data searchable by content category and date range.]

[27. The method of claim 1, wherein posting further includes providing annotation tools for associating notes with individual tracking data entries.]

[28. The method of claim 1, wherein posting further includes providing annotation tools for associating ratings with individual tracking data entries.]

[29. The method of claim 1, wherein posting further includes indexing text portions of at least a portion of pages reported from tracking the user's Internet usage.]

[30. The method of claim 29, wherein text indexing is limited to pages reported from tracking as having been annotated or forwarded by the user.]

[31. A method of sharing Internet browsing experiences, including:

tracking automatically with a client-side application at least a portion of a user's Internet usage and reporting the tracking data to a server;

categorizing at least a portion of the reported tracking data by content category;

presenting to the user a history of the reported tracking data, with tools for searching and forwarding the tracking data;

receiving from the user data identifying of one or more persons on the user's buddy lists and authorizing the persons to receive tracking data;

responsive to a user request, sending one or more entries from the history of the reported tracking data to the authorized persons.]

[32. A method of sharing computer user experiences, including:

registering a user with a registration server to collect and share visited location data using a client-side application collected while visiting a location with a location-aware device that records the visited location;

accessing one or more of the user's messaging buddy lists to identify one or more buddies with whom the tracking data may be shared;

defining rights of the buddies to access the visited location data;

posting at least a portion of the user's visited location data for the buddies to access according to their defined rights.]

*33. A non-transitory computer-readable medium storing software for instructing a controller of a location-aware device to:*

*collect visited geographic location data for geographic locations visited by the location-aware device using a client-side application, the visited geographic location data comprising a plurality of the geographic locations visited by the location-aware device, each geographic location visited time-stamped with a time of visit, the geographic locations visited automatically and passively recorded by the location-aware device;*

*in response to user inputs received at the location-aware device, associate one or more of the geographic locations visited with one or more of an emoticon, user rating, bookmark, description, and user comment;*

*report, to a server device, first information indicating the visited geographic location data;*

*receive, from the server device, second information based on a geographic location of the location-aware device;*

*present, on a display of the location-aware device, the second information in a context sensitive manner;*

*receive, from the server device, third information identifying patterns in the visited geographic location data by the location-aware device;*

*present, on the display of the location-aware device, the third information;*

*receive, from the server device, fourth information identifying an other location-aware device in geographical proximity to the location-aware device; and*

*present, on the display of the location-aware device, the fourth information.*

*34. The non-transitory computer-readable medium of claim 33 wherein the controller of the location-aware device is further instructed to:*

*register a user of the location-aware device with the server device to collect the visited geographic location data.*

*35. The non-transitory computer-readable medium of claim 34 wherein the server device is a registration server device and the location-aware device is operable to present information making the user aware that the visited geographic location data is to be collected.*

*36. The non-transitory computer-readable medium of claim 34 wherein the server device is a tracking server device.*

*37. The non-transitory computer-readable medium of claim 34 wherein the server device is a registration and tracking server device.*

*38. The non-transitory computer-readable medium of claim 34 wherein the user and an other user are both users of an instant messaging system.*

*39. The non-transitory computer-readable medium of claim 34 wherein the user and an other user are associated electronically through an invitation process.*

*40. The non-transitory computer-readable medium of claim 33 wherein the location-aware device is a location-aware cellular phone device.*

*41. The non-transitory computer-readable medium of claim 33 wherein the location-aware device is a location-aware PDA device.*

*42. A non-transitory computer-readable medium storing software for instructing at least one controller of a server device to:*

*receive, at the server device, registrations of a plurality of users for automatic and passive client-side collection of first information, the first information including visited geographic location data, wherein the visited geographic location data define geographic locations visited, each geographic location visited time-stamped with a time of visit, the client-side collection occurring via a client-side application on a corresponding plurality of location-aware devices, the plurality of location-aware devices including a location-aware device and an other location-aware device, one or more of the geographic locations visited associated with one or more of an emoticon, user rating, bookmark, description, and user comment assigned at the location-aware device;*

*process the visited geographic location data to determine second information based on a geographic location of the location-aware device;*

*send, to the location-aware device, the second information;*

*process the visited geographic location data to determine third information identifying patterns in the visited geographic location data by the location-aware device;*

*send, to the location-aware device, the third information;*

*process the visited geographic location data to determine fourth information identifying the other location-aware device in geographical proximity to the location-aware device; and*

*send, to the location-aware device, the fourth information.*

*43. The non-transitory computer-readable medium of claim 42 wherein the controller of the server device is further instructed to:*

*receive a registration of a user of the location-aware device and an other registration of an other user of the other location-aware device, the registrations to collect the visited geographic location data.*

*44. The non-transitory computer-readable medium of claim 43 wherein the server device is a registration server device and the plurality of location-aware devices are operable to present information making the users aware that the visited geographic location data is to be collected.*

*45. The non-transitory computer-readable medium of claim 43 wherein the server device is a tracking server device.*

*46. The non-transitory computer-readable medium of claim 43 wherein the server device is a registration and tracking server device.*

*47. The non-transitory computer-readable medium of claim 43 wherein the user and the other user are both users of an instant messaging system.*

*48. The non-transitory computer-readable medium of claim 43 wherein the user and the other user are associated electronically through an invitation process.*

*49. The non-transitory computer-readable medium of claim 42 wherein the location-aware device is a location-aware cellular phone device.*

*50. The non-transitory computer-readable medium of claim 42 wherein the location-aware device is a location-aware PDA device.*

*51. A location-aware device comprising:*

*a network interface operable to:*

*connect the location-aware device to a server device over a network; and*

*a controller and memory, coupled to the network interface, operable to:*

*collect visited geographic location data for geographic locations visited by the location-aware device using a client-side application, the visited geographic location data comprising a plurality of the geographic locations visited by the location-aware device, each geographic location visited time-stamped with a time of visit, the geographic locations visited automatically and passively recorded by the location-aware device;*

*in response to user inputs received at the location-aware device, associate one or more of the geographic locations visited with one or more of an emoticon, user rating, bookmark, description, and user comment;*

*report, to the server device, first information indicating the visited geographic location data;*

*receive, from the server device, second information based on a geographic location of the location-aware device;*

*present, on a display of the location-aware device, the second information in a context sensitive manner;*

*receive, from the server device, third information identifying patterns in the visited geographic location data by the location-aware device;*

*present, on the display of the location-aware device, the third information;*

*receive, from the server device, fourth information identifying an other location-aware device in geographical proximity to the location-aware device; and*

*present, on the display of the location-aware device, the fourth information.*

*52. The location-aware device of claim 51 further operable to:*

*register a user of the location-aware device with the server device to collect the visited geographic location data.*

*53. The location-aware device of claim 52 wherein the server device is a registration server device and the location-aware device is operable to present information making the user aware that the visited geographic location data is to be collected.*

*54. The location-aware device of claim 52 wherein the server device is a tracking server device.*

*55. The location-aware device of claim 52 wherein the server device is a registration and tracking server device.*

*56. The location-aware device of claim 52 wherein the user and an other user are both users of an instant messaging system.*

*57. The location-aware device of claim 52 wherein the user and an other user are associated electronically through an invitation process.*

*58. The location-aware device of claim 51 wherein the location-aware device is a location-aware cellular phone device.*

*59. The location-aware device of claim 51 wherein the location-aware device is a location-aware PDA device.*

*60. A server device comprising:*

*a network interface operable to:*

*connect the server device to a plurality of location-aware devices over a network; and*

*a controller and memory, coupled to the network interface, operable to:*

*receive, at the server device, registrations of a plurality of users for automatic and passive client-side collection of first information, the first information including visited geographic location data, wherein the visited geographic location data define geographic locations visited, each geographic location visited time-stamped with a time of visit, the client-side collection occurring via a client-side application on a corresponding plurality of location-aware devices, the plurality of location-aware devices including a location-aware device and an other location-aware device, one or more of the geographic locations visited associated with one or more of an emoticon, user rating, bookmark, description, and user comment assigned at the location-aware device;*

*process the visited geographic location data to determine second information based on a geographic location of the location-aware device;*

*send, to the location-aware device, the second information;*

*process the visited geographic location data to determine third information identifying patterns in the visited geographic location data by the location-aware device;*

*send, to the location-aware device, the third information;*

*process the visited geographic location data to determine fourth information identifying the other location-aware device in geographical proximity to the location-aware device; and*

*send, to the location-aware device, the fourth information.*

*61. The server device of claim 60 further operable to:*

*receive a registration of a user of the location-aware device and an other registration of an other user of the other location-aware device, the registrations to collect the visited geographic location data.*

*62. The server device of claim 61 wherein the server device is a registration server device and the plurality of location-aware devices are operable to present information making the users aware that the visited geographic location data is to be collected.*

*63. The server device of claim 61 wherein the server device is a tracking server device.*

*64. The server device of claim 61 wherein the server device is a registration and tracking server device.*

*65. The server device of claim 61 wherein the user and the other user are both users of an instant messaging system.*

*66. The server device of claim 61 wherein the user and the other user are associated electronically through an invitation process.*

*67. The server device of claim 60 wherein the location-aware device is a location-aware cellular phone device.*

*68. The server device of claim 60 wherein the location-aware device is a location-aware PDA device.*

*69. A computer implemented method of operating a location-aware device, the method comprising:*

*collecting visited geographic location data for geographic locations visited by the location-aware device using a client-side application, the visited geographic location data comprising a plurality of the geographic locations visited by the location-aware device, each geographic location visited time-stamped with a time of visit, the geographic locations visited automatically and passively recorded by the location-aware device;*

*in response to user inputs received at the location-aware device, associate one or more of the geographic locations visited with one or more of an emoticon, user rating, bookmark, description, and user comment;*

*reporting, to a server device, first information indicating the visited geographic location data;*

*receiving, from the server device, second information based on a geographic location of the location-aware device;*

*presenting, on a display of the location-aware device, the second information in a context sensitive manner;*

*receiving, from the server device, third information identifying patterns in the visited geographic location data by the location-aware device;*

*presenting, on the display of the location-aware device, the third information;*

*receiving, from the server device, fourth information identifying an other location-aware device in geographical proximity to the location-aware device; and*

*presenting, on the display of the location-aware device, the fourth information.*

*70. The computer implemented method of claim 69 further comprising:*

*registering a user of the location-aware device with the server to collect the visited geographic location data.*

*71. The computer implemented method of claim 70 wherein the server device is a registration server device and the location-aware device is operable to present information making the user aware that the visited geographic location data is to be collected.*

*72. The computer implemented method of claim 70 wherein the server device is a tracking server device.*

*73. The computer implemented method of claim 70 wherein the server device is a registration and tracking server device.*

*74. The computer implemented method of claim 70 wherein the user and an other user are both users of an instant messaging system.*

*75. The computer implemented method of claim 70 wherein the user and an other user are associated electronically through an invitation process.*

*76. The computer implemented method of claim 69 wherein the location-aware device is a location-aware cellular phone device.*

*77. The computer implemented method of claim 69 wherein the location-aware device is a location-aware PDA device.*

*78. A computer implemented method of operating a server device, the method comprising:*

*receiving, at the server device, registrations of a plurality of users for automatic and passive client-side collection of first information, the first information including visited geographic location data, wherein the visited geographic location data define geographic locations visited, each geographic location visited time-stamped with a time of visit, the client-side collection occurring via a client-side application on a corresponding plurality of location-aware devices, the plurality of location-aware devices including a location-aware device and an other location-aware device, one or more of the geographic locations visited associated with one or more of an emoticon, user rating, bookmark, description, and user comment assigned at the location-aware device;*

*processing the visited geographic location data to determine second information based on a geographic location of the location-aware device;*

*sending, to the location-aware device, the second information;*

*processing the visited geographic location data to determine third information identifying patterns in the visited geographic location data by the location-aware device;*

*sending, to the location-aware device, the third information;*

*processing the visited geographic location data to determine fourth information identifying the other location-aware device in geographical proximity to the location-aware device; and*

*sending, to the location-aware device, the fourth information.*

*79. The computer implemented method of claim 78 further comprising:*

*receiving a registration of a user of the location-aware device and an other registration of an other user of the other location-aware device, the registrations to collect the visited geographic location data.*

*80. The computer implemented method of claim 79 wherein the server device is a registration server device and the plurality of location-aware devices are operable to present information making the users aware that the visited geographic location data is to be collected.*

*81. The computer implemented method of claim 79 wherein the server device is a tracking server device.*

*82. The computer implemented method of claim 79 wherein the server device is a registration and tracking server device.*

*83. The computer implemented method of claim 79 wherein the user and the other user are both users of an instant messaging system.*

*84. The computer implemented method of claim 79 wherein the user and the other user are associated electronically through an invitation process.*

*85. The computer implemented method of claim 78 wherein the location-aware device is a location-aware cellular phone device.*

*86. The computer implemented method of claim 78 wherein the location-aware device is a location-aware PDA device.*

* * * * *